United States Patent
Ikeda

(10) Patent No.: US 9,840,086 B2
(45) Date of Patent: Dec. 12, 2017

(54) INK-JET RECORDING METHOD

(71) Applicant: Konica Minolta, Inc., Tokyo (JP)

(72) Inventor: Masashi Ikeda, Tokyo (JP)

(73) Assignee: KONICA MINOLTA, INC., Tokyo (JP)

(*) Notice: Subject to any disclaimer, the term of this patent is extended or adjusted under 35 U.S.C. 154(b) by 0 days.

(21) Appl. No.: 15/122,692

(22) PCT Filed: Mar. 13, 2015

(86) PCT No.: PCT/JP2015/057547
§ 371 (c)(1),
(2) Date: Aug. 31, 2016

(87) PCT Pub. No.: WO2015/137498
PCT Pub. Date: Sep. 17, 2015

(65) Prior Publication Data
US 2017/0066250 A1   Mar. 9, 2017

(30) Foreign Application Priority Data
Mar. 14, 2014 (JP) ................... 2014-052306

(51) Int. Cl.
*B41J 2/19* (2006.01)
*B41J 2/175* (2006.01)
(Continued)

(52) U.S. Cl.
CPC ............. *B41J 2/19* (2013.01); *B41J 2/175* (2013.01); *C09D 11/101* (2013.01); *C09D 11/12* (2013.01); *C09D 11/322* (2013.01); *B41M 7/0081* (2013.01)

(58) Field of Classification Search
None
See application file for complete search history.

(56) References Cited

U.S. PATENT DOCUMENTS

2006/0284948 A1   12/2006   Ikeda et al.
2007/0200902 A1*   8/2007   Eve ................. B41J 2/175
                                            347/84
(Continued)

FOREIGN PATENT DOCUMENTS

EP   1714788 A1   10/2006
EP   2540783 A1    1/2013
(Continued)

OTHER PUBLICATIONS

Iijima, Hirotaka (JP, 2013/161298, A1—Machine Translation), Oct. 31, 2013, Konica Minolta, Paragraphs [0012, 0014, 0016, 0034, 0047, 0049, 105-106, 0110-0111].*

(Continued)

*Primary Examiner* — Lisa M Solomon
(74) *Attorney, Agent, or Firm* — Lucas & Mercanti, LLP

(57) ABSTRACT

The present invention addresses the problem of providing an ink-jet recording method with which it is possible to sufficiently remove air bubbles contained in an actinic-ray-curable ink-jet ink and to heighten the delivery stability and curability of the ink. The ink-jet recording method employs an actinic-ray-curable ink-jet ink which comprises a colorant, a photopolymerization initiator, and a photopolymerizable compound. The ink-jet recording method comprises: a step in which the ink-jet ink is introduced into a depressurized space within an ink-jet recorder and deaerated at an ink temperature which is 50° C. or higher but lower than 120° C.; a step in which droplets of the deaerated ink-jet ink are ejected from the recording head and delivered to a recording medium; and a step in which the ink droplets delivered to the recording medium are irradiated with actinic rays to cure the ink droplets.

7 Claims, 7 Drawing Sheets

(51) Int. Cl.
    *C09D 11/101*    (2014.01)
    *C09D 11/12*     (2006.01)
    *C09D 11/322*    (2014.01)
    *B41M 7/00*          (2006.01)

(56) References Cited

U.S. PATENT DOCUMENTS

| | | | |
|---|---|---|---|
| 2009/0167829 A1* | 7/2009 | Iijima | C09D 11/322 347/92 |
| 2013/0286120 A1 | 10/2013 | Kobayashi et al. | |

FOREIGN PATENT DOCUMENTS

| | | | |
|---|---|---|---|
| JP | S5630869 A | 3/1981 |
| JP | H1148493 A | 2/1999 |
| JP | H11209670 A | 8/1999 |
| JP | 2007008087 A | 1/2007 |
| JP | 2009510184 A | 3/2009 |
| JP | 2011194844 A | 10/2011 |
| JP | 2013010832 A | 1/2013 |
| JP | 2013237276 A | 11/2013 |
| WO | 2013161298 A1 | 10/2013 |
| WO | 2015022780 A1 | 2/2015 |

OTHER PUBLICATIONS

International Search Report dated Apr. 21, 2015 for PCT/JP2015/057547 and English translation.
IPRP dated Oct. 4, 2016 from corresponding International Application; International application No. PCT/JP2015/057547; Total of 7pages.
Extended European Search Report dated Aug. 30, 2017 from corresponding European Application No. 15761864.6.

* cited by examiner

INK-JET RECORDING METHOD

CROSS REFERENCE TO RELATED APPLICATION

This Application is a 371 of PCT/JP2015/057547 filed on Mar. 13, 2015 which, in turn, claimed the priority of Japanese Patent Application No. JP2014-052306 filed Mar. 14, 2014, both applications are incorporated herein by reference.

TECHNICAL FIELD

The present invention relates to an inkjet recording method.

BACKGROUND ART

Inkjet recording methods enable simple and inexpensive image formation, and therefore have been used for the formation of various images. One example of inks to be used for the inkjet recording methods is an actinic radiation-curable inkjet ink. As for the actinic radiation-curable inkjet ink, most part of the ink component is cured due to the irradiation with actinic radiation such as ultraviolet rays. Accordingly, discharged ink is immobilized more easily than a solvent-based ink composition, so that an image is less likely to bleed. Therefore, the actinic radiation-curable inkjet ink has an advantage of enabling images to be formed on various recording media.

Image formation by means of inkjet recording method is typically performed by discharging an ink from a recording head of an inkjet recording apparatus. However, when the ink contains air bubbles in discharging the ink from the recording head, discharge deficiency may occur. Here, the above-mentioned actinic radiation-curable inkjet ink, in particular, an actinic radiation-curable inkjet ink containing a wax has higher viscosity than a solvent-based ink, and thus air bubbles mixed thereinto during ink production or storing are not easily degassed. This tends to cause the deficiency of ink discharge from an inkjet recording apparatus (e.g., Patent Literature (hereinafter, referred to as "PTL") 1).

Examples of proposed method of removing air bubbles contained in an ink include a method of degassing an ink by allowing it to flow through a hollow fiber degassing module before filling a cartridge with the ink (e.g., PTL 2); and a method of degassing an ink immediately before being discharged with a degassing filter provided inside an inkjet recording apparatus (e.g., PTL 3). Further, a method of degassing an ink by spraying the ink into a depressurized space provided inside an inkjet recording apparatus (e.g., PTL 4) is also proposed. Furthermore, a method of degassing an ink by allowing the ink to flow little by little for a long period of time inside a depressurized space provided in an inkjet recording apparatus (e.g., PTL 5) is also proposed.

CITATION LIST

Patent Literature

PTL 1
Japanese Translation of a PCT Application Laid-Open No. 2009-510184
PTL 2
Japanese Patent Application Laid-Open No. 11-209670
PTL 3
Japanese Patent Application Laid-Open No. 2013-10832
PTL 4
Japanese Patent Application Laid-Open No. 2007-8087
PTL 5
Japanese Patent Application Laid-Open No. 2011-194844

SUMMARY OF INVENTION

Technical Problem

Here, an actinic radiation-curable inkjet ink containing air bubbles also causes, in addition to the above-mentioned defect (discharge deficiency), a problem of susceptibility to oxygen inhibition during ink curing due to dissolved oxygen in the ink, which leads to the lowering of ink curability. To address such problems, it is considered that the above-mentioned various methods are used to degass the ink. However, the actinic radiation-curable inkjet ink has relatively high viscosity as described above, and thus it is not possible for the method disclosed in Cited Reference 2 to remove sufficiently air bubbles contained in the actinic radiation-curable inkjet ink.

Also, there are problems of nonuniformity in curability of an image output from an inkjet recording apparatus, and of incapability of securing sufficient discharge stability, when degassing a typical actinic radiation-curable inkjet ink while depressurizing the ink according to a method disclosed in Cited Reference 4 or 5.

The present invention has been achieved in view of the above-described circumstances, and an object of the present invention is to provide an inkjet recording method capable of sufficiently removing air bubbles contained in an actinic radiation-curable inkjet ink, and of enhancing discharge stability and curability.

Solution to Problem

[1] An inkjet recording method using an actinic radiation-curable inkjet ink containing a coloring material, a photopolymerization initiator, and a photopolymerizable compound having a molecular weight within a range of 250 to 1,500, the method including: introducing the inkjet ink into a depressurized space inside an inkjet recording apparatus to degass the inkjet ink at an ink temperature of 50° C. or higher to lower than 120° C.; discharging ink droplets of the degassed inkjet ink from a recording head to land the ink droplets onto a recording medium; and irradiating the ink droplets landed on the recording medium with actinic radiation to cure the ink droplets.

[2] The inkjet ink recording method according to [1], in which the photopolymerizable compound has a molecular weight of 400 to 1,500, and the inkjet ink contains 30 to 70 mass % of the photopolymerizable compound based on a total amount of the inkjet ink.

[3] The inkjet ink recording method according to [1] or [2], in which the inkjet ink further contains a wax.

[4] The inkjet ink recording method according to any one of [1] to [3], in which the degassing step is a step of degassing the inkjet ink while degassing the space to have a vacuum of less than −90 kPa.

[5] The inkjet ink recording method according to any one of [1] to [4], in which the curing step is a step of moving the recording medium and a light source of the actinic radiation relatively with each other at 50 m/min or higher to cure the ink droplets.

Advantageous Effects of Invention

According to the present invention, it is possible to provide an inkjet recording method capable of sufficiently removing air bubbles contained in an actinic radiation-curable inkjet ink, and of enhancing discharge stability and curability.

DESCRIPTION OF EMBODIMENTS

Figure 1:
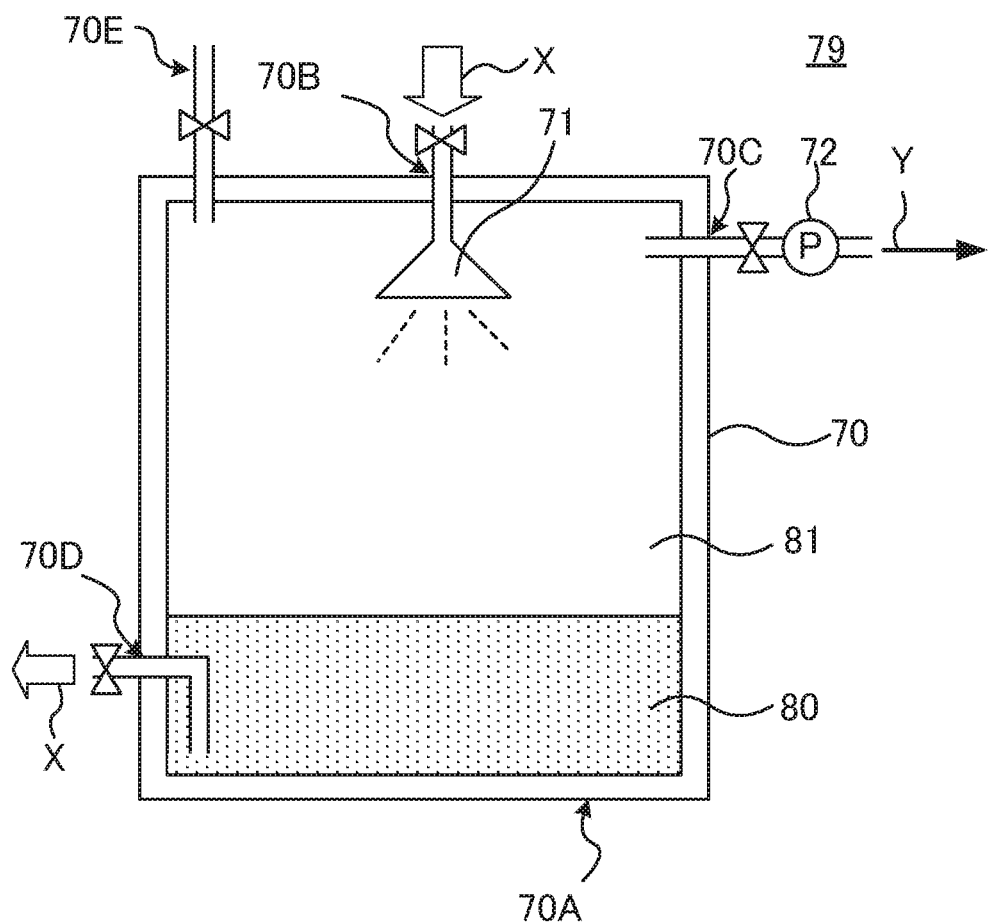
FIG. 1 is a schematic diagram illustrating an example of a depressurization degassing module.

Hereinafter, modes for practicing the present invention will be described in detail.

The present inventor have found that, when an actinic radiation-curable inkjet ink containing a component having a relatively high molecular weight is depressurized and degassed while being warmed, air bubbles contained in the ink can be sufficiently removed, and that, in addition, there is less nonuniformity in curability of an image output product.

As described above, when a conventional actinic radiation-curable inkjet ink is degassed while being depressurized, nonuniformity sometimes occurs in curability of an image output product from an inkjet recording apparatus. A typical actinic radiation-curable inkjet ink is composed of a polymerizable compound having relatively low molecular weight due to the restriction on viscosity during discharging. Accordingly, when the ink is tried to be degassed while being depressurized, a photopolymerizable compound volatilizes, and thus the composition of the ink to be discharged from the inkjet recording apparatus is changed. It is deduced that, even when the ink is sufficiently degassed, the ink curability consequently undergoes a change, and thus nonuniformity is more likely to occur in the curability of an output image. On the other hand, when the degassing is insufficient, it is difficult to achieve satisfactory discharge stability or curability due to dissolved air or dissolved oxygen in the ink. Further, there is a concern that, when the ink is tried to be degassed under reduced pressure, odor may occur due to volatilization of the photopolymerizable compound, causing operation environments to be worse.

In contrast, the actinic radiation-curable inkjet ink to be used for the inkjet recording method of the present invention contains a photopolymerizable compound having relatively high molecular weight (molecular weight of 250 to 1,500). Accordingly, even when the ink is depressurized and degassed while being warmed, the composition of the ink is less likely to be changed, so that the curability of an output image is less likely to be changed. In addition, according to the method of the present invention, the viscosity of the ink during degassing is lowered by heating, so that the ink can be degassed efficiently. Therefore, according to the method of the present invention, it is possible to stably discharge the ink from a recording head, and also the curability of an image output product to be obtained is uniform. Further, this method is also adaptable to high-speed image output. Furthermore, the inkjet recording method of the present invention can also have an effect in which odor is less likely to occur during a degassing step, because a photopolymerizable compound is less likely to volatilize from the above-mentioned actinic radiation-curable inkjet ink.

1. Actinic Radiation-Curable Inkjet Ink

The actinic radiation-curable inkjet ink to be used for the method of the present invention may contain a photopolymerizable compound, a coloring material and a photopolymerization initiator, and may further contain other components as necessary.

<Photopolymerizable Compound>

A photopolymerizable compound contained in the actinic radiation-curable inkjet ink is a compound which is cross-linked or polymerized by irradiation with actinic radiation. Examples of the actinic radiation include electron rays, ultraviolet rays, α-rays, γ-rays, and X-rays, with ultraviolet rays being preferred.

Photopolymerizable Compound Having a Molecular Weight of 250 to 1,500

The actinic radiation-curable inkjet ink contains a photopolymerizable compound having a molecular weight of 250 to 1,500. The molecular weight of the photopolymerizable compound is preferably 400 to 1,500, and more preferably 600 to 1,500. When the molecular weight of the photopolymerizable compound is 250 or more, the photopolymerizable compound is less likely to volatilize in a degassing step to be described later. On the other hand, when the molecular weight of the photopolymerizable compound is 1,500 or less, the viscosity of the actinic radiation-curable inkjet ink is not increased excessively, so that the discharge stability of the ink from the inkjet recording apparatus becomes favorable.

Based on the total amount of the actinic radiation-curable inkjet ink, preferably 30 to 70 mass % of the photopolymerizable compound having a molecular weight of 250 to 1,500 is contained, more preferably 40 to 70 mass % thereof is contained, and even more preferably 50 to 70 mass % thereof is contained. When the amount of the photopolymerizable compound is 30 mass % or more, there is less component that volatilizes during degassing of the ink, so that nonuniformity or the like is less likely to occur in the curability of an image output product. Further, when the amount of the photopolymerizable compound is 70 mass % or less, the viscosity of the ink during discharging is decreased, so that high discharge stability can be achieved.

Here, the photopolymerizable compound having a molecular weight of 250 to 1,500 may be a radical polymerizable compound. The radical polymerizable compound can be a compound having a radically polymerizable ethylenic unsaturated bond, and may be any of a monomer, oligomer, polymer, mixture thereof, or the like. The radical polymerizable compound having a molecular weight of 250 to 1,500 may be contained singly or in combination in the actinic radiation-curable inkjet ink.

Examples of the compound having a radically polymerizable ethylenic unsaturated bond include an unsaturated carboxylic acid or a salt thereof, an unsaturated carboxylic acid ester compound; an unsaturated carboxylic acid urethane compound; an unsaturated carboxylic acid amide compound or an anhydride thereof; an unsaturated polyester; an unsaturated polyether; an unsaturated polyamide; and an unsaturated urethane.

The radical polymerizable compound is preferably an unsaturated carboxylic acid ester compound, and particularly preferably a (meth)acrylate compound (monomer or oligomer) or a modified product thereof, or an oligomer in which a polymerizable functional group is further added to a (meth)acrylate compound. As used herein, "(meth)acrylate" refers to both or one of "acrylate" and "(meth)acrylate," and "(meth)acrylic" refers to both or one of "acrylic" and "(meth)acrylic."

Examples of "(meth)acrylate monomer" having a molecular weight of 250 to 1,500 include:

monofunctional monomers such as stearyl (meth)acrylate, lauryl methacrylate, isomyristyl (meth)acrylate, isostearyl (meth)acrylate, 2-ethylhexyl-diglycol (meth)acrylate, 2-(meth)acryloyloxyethylhexahydrophthalic acid, methoxy-polyethylene glycol (meth)acrylate, 2-(meth)acryloyloxy-ethylphthalic acid, and 2-(meth)acryloyloxyethyl-2-hydroxyethyl-phthalic acid;

bifunctional monomers such as triethylene glycol di(meth)acrylate, tetraethylene glycol di(meth)acrylate, polyethylene glycol di(meth)acrylate, tripropylene glycol di(meth)acrylate, polypropylene glycol di(meth)acrylate, 1,6-hexanediol dimethacrylate, 1,9-nonanediol di(meth)acrylate, dimethylol-tricyclodecane di(meth)acrylate, bisphenol A PO adduct di(meth)acrylate, hydroxypivalic acid neopentyl glycol di(meth)acrylate, and polytetramethylene glycol di(meth)acrylate; and tri- or higher polyfunctional monomers such as trimethylolpropane tri(meth)acrylate, pentaerythritol tri(meth)acrylate, pentaerythritol tetra(meth)acrylate, dipentaerythritol hexa(meth)acrylate, ditrimethylolpropane tetra(meth)acrylate, glycerol propoxy tri(meth)acrylate, and pentaerythritol ethoxy tetra(meth)acrylate.

Further, examples of "(meth)acrylate oligomer" having a molecular weight of 250 to 1,500 include oligomers of the above-mentioned (meth)acrylate monomers, and oligomers of (meth)acrylate monomers having a molecular weight of less than 250 to be described later.

On the other hand, examples of "a modified product of the (meth)acrylate compound" having a molecular weight of 250 to 1,500 include: ethylene oxide-modified (meth)acrylate compounds such as ethylene oxide-modified trimethylolpropane tri(meth)acrylate and ethylene oxide-modified pentaerythritol tetraacrylate; caprolactone-modified (meth)acrylate compounds such as caprolactone-modified trimethylolpropane tri(meth)acrylate; and caprolactam-modified (meth)acrylate compounds such as caprolactam-modified dipentaerythritol hexa(meth)acrylate.

From the viewpoints of high photosensitivity and of easily forming a card-house structure to be described later when a wax is contained in the actinic radiation-curable inkjet ink, the "modified product of the (meth)acrylate compound" is preferably an ethylene oxide-modified (meth)acrylate compound. Further, the ethylene oxide-modified (meth)acrylate compound easily dissolves in other ink components at high temperature and undergoes less curing shrinkage, so that curling of a printed matter does not easily occur, either.

Specific examples of the ethylene oxide-modified (meth)acrylate compound include 4EO-modified hexanediol diacrylate CD561 (molecular weight: 358), 3EO-modified trimethylolpropane triacrylate SR454 (molecular weight: 429), 6EO-modified trimethylolpropane triacrylate SR499 (molecular weight: 560), and 4EO-modified pentaerythritol tetraacrylate SR494 (molecular weight: 528) manufactured by Sartomer Company, Inc.; polyethylene glycol diacrylate NK ESTER A-400 (molecular weight: 508), polyethylene glycol diacrylate NK ESTER A-600 (molecular weight: 742), polyethylene glycol dimethacrylate NK ESTER 9G (molecular weight: 536), and polyethylene glycol dimethacrylate NK ESTER 14G (molecular weight: 770) manufactured by Shin Nakamura Chemical Co., Ltd.; tetraethylene glycol diacrylate V#335HP (molecular weight: 302) manufactured by Osaka Organic Chemical Industry, Ltd.; 3PO-modified trimethylolpropane triacrylate Photomer 4072 (molecular weight: 471, C log P: 4.90) manufactured by Cognis GmbH; 1,10-decanediol dimethacrylate NK ESTER DOD-N (molecular weight: 310, C log P: 5.75), tricyclodecanedimethanol diacrylate NK ESTER A-DCP (molecular weight: 304, C log P: 4.69) and tricyclodecanedimethanol dimethacrylate NK ESTER DCP (molecular weight: 332, C log P: 5.12) manufactured by Shin Nakamura Chemical Co., Ltd; and trimethylolpropane PO-modified triacrylate Miramer M360 (molecular weight: 471, C log P: 4.90) manufactured by Miwon Specialty Chemical Co., Ltd.

Further, examples of the "oligomer in which a polymerizable functional group is further added to a (meth)acrylate compound" having a molecular weight of 250 to 1,500 include epoxy (meth)acrylate oligomers, aliphatic urethane (meth)acrylate oligomers, aromatic urethane (meth)acrylate oligomers, polyester (meth)acrylate oligomers, and linear (meth)acrylic oligomers.

Here, the photopolymerizable compound having a molecular weight of 250 to 1,500 may include not only a radical polymerizable compound, but also a cationic polymerizable compound. The cationic polymerizable compound can be an epoxy compound, a vinyl ether compound, an oxetane compound, or the like. The cationic polymerizable compound may be contained singly or in combination in the actinic radiation-curable inkjet ink.

The "epoxy compound" which can be the cationic polymerizable compound may be an aromatic epoxide, an alicyclic epoxide, an aliphatic epoxide, or the like, and an aromatic epoxide and an alicyclic epoxide are preferred, from the viewpoint of enhancing ink curability.

The aromatic epoxide may be a di- or polyglycidyl ether obtained by reacting a polyhydric phenol or an alkylene oxide adduct thereof with epichlorohydrin. Examples of the polyhydric phenol or an alkylene oxide adduct thereof to be reacted include bisphenol A or an alkylene oxide adduct thereof. The alkylene oxide in the alkylene oxide adduct may be ethylene oxide, propylene oxide, or the like.

Further, the alicyclic epoxide may be a cycloalkane oxide-containing compound obtained by epoxidizing a cycloalkane-containing compound with an oxidizing agent such as hydrogen peroxide or peracid. The cycloalkane in the cycloalkane oxide-containing compound may be cyclohexene or cyclopentene.

Moreover, the aliphatic epoxide may be a di- or polyglycidyl ether obtained by reacting an aliphatic polyhydric alcohol or an alkylene oxide adduct thereof with epichlorohydrin. Examples of the aliphatic polyhydric alcohol include alkylene glycols such as ethylene glycol, propylene glycol, and 1,6-hexanediol. The alkylene oxide in the alkylene oxide adduct may be ethylene oxide, propylene oxide, or the like.

On the other hand, the "vinyl ether compound" which can be the cationic polymerizable compound can be monovinyl ether compounds such as octadecylvinyl ether.

The "oxetane compound" which can be the cationic polymerizable compound is a compound having an oxetane ring, and examples thereof include oxetane compounds disclosed in Japanese Patent Application Laid-Open Nos. 2001-220526, 2001-310937, and 2005-255821. Specific examples thereof include compounds represented by General Formulas (1), (2), (7), (8), and (9) disclosed, respectively, in paragraphs [0089], [0092], [0107], [0109], and [0116] of Japanese Patent Application Laid-Open No. 2005-255821. Compounds represented by General Formulas (1), (2), and (7) to (9) disclosed in Japanese Patent Application Laid-Open No. 2005-255821 are shown below:

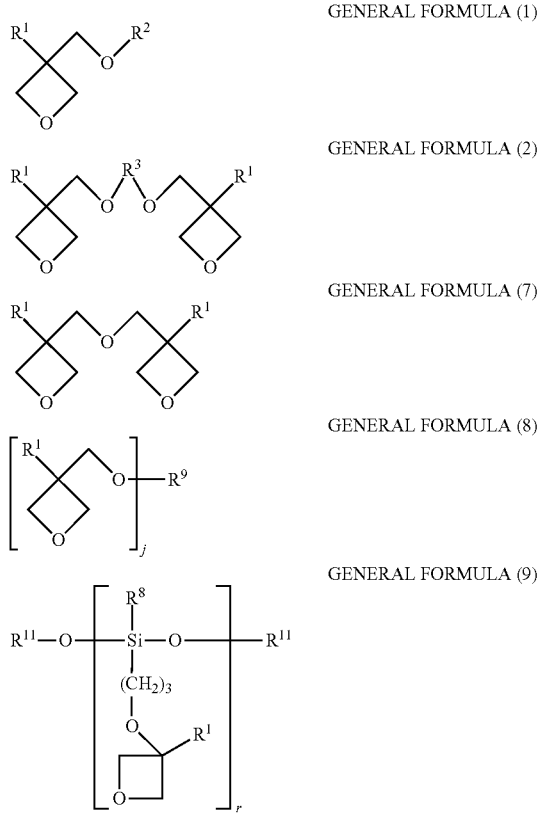

GENERAL FORMULA (1)

GENERAL FORMULA (2)

GENERAL FORMULA (7)

GENERAL FORMULA (8)

GENERAL FORMULA (9)

Other Photopolymerizable Compounds

Here, the actinic radiation-curable inkjet ink may partially contain a photopolymerizable compound having a molecular weight of less than 250. However, the amount of the photopolymerizable compound having a molecular weight of less than 250 is preferably less than 30 mass %, and more preferably less than 20 mass %, based on the total mass of the actinic radiation-curable inkjet ink. When the amount of the photopolymerizable compound having a molecular weight of less than 250 is less than 30 mass %, there is less amount of a component that volatilizes during degassing of the ink. As a result, nonuniformity or the like is less likely to occur in the curability of an image output product.

The photopolymerizable compound having a molecular weight of less than 250 may be either the radical polymerizable compound or the cationic polymerizable compound. The radical polymerizable compound having a molecular weight of less than 250 also can be an unsaturated carboxylic acid or a salt thereof; an unsaturated carboxylic acid ester compound; an unsaturated carboxylic acid urethane compound; an unsaturated carboxylic acid amide compound or an anhydride thereof; an unsaturated polyester; an unsaturated polyether; an unsaturated polyamide; an unsaturated urethane; acrylonitrile; styrene; or the like. Examples of the unsaturated carboxylic acid having a molecular weight of less than 250 include (meth)acrylic acid, itaconic acid, crotonic acid, isocrotonic acid, and maleic acid.

Further, the photopolymerizable compound having a molecular weight of less than 250 is particularly preferably the unsaturated carboxylic acid ester compound, and can be a monomer or oligomer of the (meth)acrylate compound, for example. Examples of the (meth)acrylate monomer having a molecular weight of less than 250 include:

monofunctional monomers such as isoamyl (meth)acrylate, lauryl acrylate, octyl (meth)acrylate, decyl (meth)acrylate, 2-hydroxybutyl (meth)acrylate, butoxyethyl (meth)acrylate, ethoxydiethylene glycol (meth)acrylate, methoxydiethylene glycol (meth)acrylate, methoxypropylene glycol (meth)acrylate, phenoxyethyl (meth)acrylate, tetrahydrofurfuryl (meth)acrylate, isobornyl (meth)acrylate, 2-hydroxyethyl (meth)acrylate, 2-hydroxypropyl (meth)acrylate, 2-hydroxy-3-phenoxypropyl (meth)acrylate, 2-(meth)acryloyloxyethylsuccinic acid, and t-butylcyclohexyl (meth)acrylate; and bifunctional monomers such as 1,4-butanediol di(meth)acrylate, 1,6-hexanediol diacrylate, and neopentyl glycol di(meth)acrylate.

Moreover, the photopolymerizable compound having a molecular weight of less than 250 can also be the cationic polymerizable compound, as described above. Examples of the cationic polymerizable compound having a molecular weight of less than 250 include:

monovinyl ether compounds such as ethylvinyl ether, n-butylvinyl ether, isobutylvinyl ether, cyclohexylvinyl ether, hydroxybutylvinyl ether, 2-ethylhexylvinyl ether, cyclohexane dimethanol monovinyl ether, n-propylvinyl ether, isopropylvinyl ether, isopropenyl ether-o-propylene carbonate, dodecylvinyl ether, and diethylene glycol monovinyl ether; and di- or trivinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexane dimethanol divinyl ether, and trimethylolpropane trivinyl ether. Among these vinyl ether compounds, di- or trivinyl ether compounds are preferred in consideration of curability and adhesiveness.

On the other hand, the actinic radiation-curable inkjet ink may also contain a photopolymerizable compound having a molecular weight of more than 1,500. However, the amount of the photopolymerizable compound having a molecular weight of more than 1,500 is preferably less than 30 mass %, and more preferably less than 15 mass %, based on the total mass of the actinic radiation-curable inkjet ink. When the amount of the photopolymerizable compound having a molecular weight of more than 1,500 is less than 30 mass %, the viscosity of the ink is not increased excessively, so that the discharge stability is more likely to be enhanced.

The photopolymerizable compound having a molecular weight of more than 1,500 may be either the radical polymerizable compound or the cationic polymerizable compound. The radical polymerizable compound having a molecular weight of more than 1,500 is not particularly limited, and can be, for example, a polymer, modified product, or the like of the above-mentioned photopolymerizable compound having a molecular weight of 1,500 or less.

<Coloring Material>

While the coloring material contained in the actinic radiation-curable inkjet ink can be a dye or a pigment, a pigment is preferred from the viewpoint of easily obtaining images with satisfactory weather resistance. The pigment is not particularly limited, and examples thereof may include organic pigments or inorganic pigments of the following numbers listed in Colour Index.

Examples of red or magenta pigments include Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, and 257; Pigment Violet 3, 19, 23, 29, 30, 37, 50, and 88; and Pigment Orange 13, 16, 20, and 36. Examples of blue or cyan pigments include Pigment Blue 1, 15, 15:1, 15:2, 15:3, 15:4, 15:6, 16, 17-1, 22, 27, 28, 29, 36, and 60. Examples of green pigments include Pigment Green 7, 26, 36, and 50. Examples of yellow pigments include Pigment Yellow 1, 3, 12, 13, 14, 17, 34, 35, 37, 55, 74, 81, 83, 93, 94, 95, 97, 108, 109, 110, 137, 138, 139, 153, 154, 155, 157, 166, 167, 168, 180, 185, and 193. Examples of black pigments include Pigment Black 7, 28, and 26.

The volume average particle diameter of the pigment is preferably 0.08 to 0.5 m, and the maximum particle diameter of the pigment is preferably 0.3 to 10 m, and more preferably 0.3 to 3 m. By adjusting the particle diameter of the pigment, the clogging of the nozzles of a recording head is suppressed, and the storage stability of the ink, ink transparency and curing sensitivity are maintained.

The pigment content is preferably 0.1 to 20 mass %, and more preferably 0.4 to 10 mass % based on the total amount of the actinic radiation-curable inkjet ink. When the pigment content is too low, color development of an obtained image is more likely to be poor. On the other hand, when the pigment content is too high, the ink viscosity is increased, thus making the ejection properties of ink droplets more likely to be lowered.

The pigment is dispersed by means of ball mill, sand mill, attritor, roll mill, agitator, HENSCHEL MIXER, colloid mill, ultrasonic homogenizer, pearl mill, wet jet mill, or paint shaker, for example, and is preferably dispersed such that the average particle diameter of the pigment particles is in the above-mentioned range. Dispersibility of the pigment is controlled by the selection of the pigment, pigment dispersant and dispersion medium, dispersion conditions, filtration conditions, and the like.

<Pigment Dispersant>

The actinic radiation-curable inkjet ink may further contain a pigment dispersant in order to enhance the dispersibility of the pigment. Examples of the pigment dispersant include hydroxyl group-containing carboxylic acid esters, salts of long-chain polyaminoamides and high molecular weight acid esters, salts of high molecular weight polycarboxylic acids, salts of long-chain polyaminoamides and polar acid esters, high molecular weight unsaturated acid esters, copolymerization products, modified polyurethane, modified polyacrylate, polyether ester type anionic active agents, naphthalenesulfonic acid-formalin condensate salts, aromatic sulfonic acid-formalin condensate salts, polyoxyethylene alkyl phosphoric acid esters, polyoxyethylene nonyl phenyl ether, stearylamine acetate, and the like. Examples of commercially available products of the pigment dispersant include Solsperse series of Avecia, Inc., and PB series (e.g., Ajisper PB824) of Ajinomoto Fine-Techno Co., Inc.

The amount of the pigment dispersant contained in the actinic radiation-curable inkjet ink is preferably 1 to 50 mass % based on the pigment.

<Photopolymerization Initiator>

The photopolymerization initiator contained in the actinic radiation-curable inkjet ink includes an intramolecular bond cleaving type and an intramolecular hydrogen withdrawing type. Examples of the intramolecular bond cleaving type photopolymerization initiator include acetophenones such as diethoxy acetophenone, 2-hydroxy-2-methyl-1-phenyl propan-1-one, benzyl dimethyl ketal, 1-(4-isopropyl phenyl)-2-hydroxy-2-methyl propan-1-one, 4-(2-hydroxy ethoxy) phenyl-(2-hydroxy-2-propyl) ketone, 1-hydroxy cyclohexyl phenyl ketone, 2-methyl-2-morpholino-(4-thio methylphenyl) propan-1-one, and 2-benzyl-2-dimethylamino-1-(4-morpholino phenyl)-butanone; benzoins such as benzoin, benzoin methyl ether and benzoin isopropyl ether; acyl phosphine oxides such as 2,4,6-trimethyl benzoin diphenyl phosphine oxide; benzyl, and methylphenyl glyoxy ester.

Examples of the intramolecular hydrogen withdrawing type photopolymerization initiator include benzophenones such as benzophenone, o-benzoyl benzoic acid methyl-4-phenyl benzophenone, 4,4'-dichloro benzophenone, hydroxy benzophenone, 4-benzoyl-4'-methyl-diphenyl sulfide, acrylated benzophenone, 3,3',4,4'-tetra-(t-butyl peroxy carbonyl) benzophenone, and 3,3'-dimethyl-4-methoxy benzophenone; thioxanthones such as 2-isopropyl thioxanthone, 2,4-dimethyl thioxanthone, 2,4-diethyl thioxanthone, and 2,4-dichloro thioxanthone; aminobenzophenones such as Michler's ketone and 4,4'-diethylaminobenzophenone; 10-butyl-2-chloro acridone, 2-ethyl anthraquinone, 9,10-phenanthrene quinone, and camphor quinone.

When the photopolymerization initiator is an acyl phosphine oxide or an acyl phosphonate, the sensitivity of the actinic radiation-curable inkjet ink to light is satisfactory. Specifically, bis(2,4,6-trimethylbenzoyl)-phenylphosphine oxide, bis(2,6-dimethoxybenzoyl)-2,4,4-trimethyl-pentyl-phosphine oxide, and the like are preferred.

The amount of the photopolymerization initiator contained in the actinic radiation-curable inkjet ink is preferably 0.1 to 10 mass %, and more preferably 2 to 8 mass %, based on the total mass of the actinic radiation-curable inkjet ink, although the amount thereof is appropriately selected depending on the type of light to be emitted during the curing of the ink, or photopolymerizable compounds, or the like.

A photoacid generating agent may be contained in the photopolymerization initiator. Examples of the photoacid generating agent include compounds used for chemical amplification type photoresists or photo-cationic polymerization (refer to pages 187 to 192 of "Imaging Yo Yuki Zairyo (Organic Materials Used for Imaging Applications)" edited by The Japanese Research Association for Organic Electronics Materials published by Bunshin Publishing (1993)).

The actinic radiation-curable inkjet ink may further contain a photopolymerization initiator auxiliary agent, a polymerization inhibitor, or the like, as necessary. The photopolymerization initiator auxiliary agent may be a tertiary amine compound, and is preferably an aromatic tertiary amine compound. Examples of the aromatic tertiary amine compound include N,N-dimethylaniline, N,N-diethylaniline, N,N-dimethyl-p-toluidine, N,N-dimethylamino-p-benzoic acid ethyl ester, N,N-dimethylamino-p-benzoic acid isoamyl ethyl ester, N,N-dihydroxy ethylaniline, triethylamine, and N,N-dimethyl hexylamine. Among those, N,N-dimethylamino-p-benzoic acid ethyl ester and N,N-dimethylamino-p-benzoic acid isoamyl ethyl ester are preferred. These compounds may be contained singly or in combination in the ink.

Examples of the polymerization inhibitor include (alkyl) phenol, hydroquinone, catechol, resorcin, p-methoxyphenol, t-butyl catechol, t-butyl hydroquinone, pyrogallol, 1,1-picrylhydrazyl, phenothiazine, p-benzoquinone, nitrosobenzene, 2,5-di-t-butyl-p-benzoquinone, dithiobenzoyl disulfide, picric acid, cupferron, aluminum N-nitrosophenyl hydroxylamine, tri-p-nitrophenylmethyl, N-(3-oxyanilino-1, 3-dimethylbutylidene)aniline oxide, dibutyl cresol, cyclohexanone oxime cresol, guaiacol, o-isopropylphenol, butyraldoxime, methyl ethyl ketoxime, and cyclohexanone oxime.

<Wax>

The actinic radiation-curable inkjet ink may further contain a wax. A wax typically contains a hydrophobic group, and thus is likely to interact with the surface of a pigment having high hydrophobicity. Accordingly, when the wax is contained, the liquid component of the actinic radiation-curable inkjet ink is more likely to be spread on the surface of the pigment, causing bubble nuclei on the surface of the pigment to be easily removed. When such an actinic radiation-curable inkjet ink containing a wax is degassed under heating and reduced pressure, air bubbles in the ink are removed more easily. Further, when a wax is contained in ink droplets, the ink droplets after landing on a recording medium have high viscosity and are not excessively spread, and thus less oxygen is dissolved into the surface of the ink droplets. Accordingly, the curability of an image output product is further enhanced.

Examples of such a wax include:

aliphatic ketone compounds;

aliphatic ester compounds;

petroleum waxes such as paraffin wax, microcrystalline wax, and petrolatum;

plant-derived waxes such as candelilla wax, carnauba wax, rice wax, sumac wax, jojoba oil, solid jojoba wax, and jojoba ester;

animal-derived waxes such as beeswax, lanolin, and spermaceti;

mineral waxes such as montan wax and hydrogenated wax;

hydrogenated castor oil and hydrogenated castor oil derivatives;

modified waxes such as montan wax derivatives, paraffin wax derivatives, microcrystalline wax derivatives, and polyethylene wax derivatives;

higher fatty acids such as behenic acid, arachidic acid, stearic acid, palmitic acid, myristic acid, lauric acid, oleic acid, and erucic acid;

higher alcohols such as stearyl alcohol and behenyl alcohol;

hydroxystearic acids such as 12-hydroxystearic acid;

12-hydroxystearic acid derivatives;

fatty acid amides such as lauric acid amide, stearic acid amide, behenic acid amide, oleic acid amide, erucic acid amide, ricinoleic acid amide, and 12-hydroxystearic acid amide (e.g., NIKKA AMIDE series manufactured by Nippon Kasei Chemical Co., Ltd., ITOWAX series manufactured by Itoh Oil Chemicals Co., Ltd., FATTY AMID series manufactured by Kao Corporation, and the like);

N-substituted fatty acid amides such as N-stearyl stearic acid amide, and N-oleyl palmitic acid amide;

specialty fatty acid amides such as N,N'-ethylene bis-stearylamide, N,N'-ethylene bis-12-hydroxystearylamide, and N,N'-xylylene bisstearylamide;

higher amines such as dodecylamine, tetradecylamine, and octadecylamine;

fatty acid ester compounds such as stearyl stearic acid ester, oleyl palmitic acid ester, glycerin fatty acid ester, sorbitan fatty acid ester, propylene glycol fatty acid ester, ethylene glycol fatty acid ester, and polyoxyethylene fatty acid ester (e.g., EMALLEX series manufactured by Nihon Emulsion Co., Ltd., RIKEMAL series manufactured by Riken Vitamin Co., Ltd., POEM series manufactured by Riken Vitamin Co., Ltd., and the like);

sucrose fatty acid esters such as sucrose stearic acid ester and sucrose palmitic acid ester (e.g., RYOTO Sugar Ester series manufactured by Mitsubishi-Kagaku Foods Corporation);

synthetic waxes such as polyethylene wax and α-olefin-maleic anhydride copolymer wax (UNILIN series manufactured by Baker-Petrolite Corporation, and the like);

dimer acids;

dimer diols (PRIPOR series manufactured by CRODA International Plc, and the like);

fatty acid inulins such as inulin stearate;

fatty acid dextrins such as dextrin palmitate and dextrin myristate (RHEOPEARL series manufactured by Chiba Flour Milling Co., Ltd.);

glyceryl behenate eicosadioate;

polyglyceryl eicosane behenate (NOMCORT series manufactured by Nisshin Oillio Group, Ltd.);

amide compounds such as N-lauroyl-L-glutamic acid dibutylamide and N-(2-ethylhexanoyl)-L-glutamic acid dibutylamide (available from Ajinomoto Fine-Techno Co., Inc.);

dibenzylidene sorbitols such as 1,3:2,4-bis-O-benzylidene-D-glusitol (GEL ALL D, available from New Japan Chemical Co., Ltd.); and low molecular weight oil waxes such as those disclosed in Japanese Patent Application Laid-Open Nos. 2005-126507, 2005-255821, and 2010-111790.

Among those, from the viewpoint of easily enhancing the pinning properties of ink droplets after landing, waxes preferably have the function of allowing an ink to undergo reversible sol-gel phase transition depending on temperature. Such waxes are required, at least, 1) to be dissolved in a photopolymerizable compound at a temperature higher than the gelling temperature, and 2) to be crystallized in the ink at a temperature equal to or lower than the gelling temperature.

When the wax becomes a plate-like crystal in the ink, a plurality of the plate-like crystals aggregate to form a three-dimensional structure containing a space therein; the photopolymerizable compound may be sometimes retained inside this structure. Such a structure is generally referred to as "card house structure." Once this card house structure is formed in ink droplets, the liquid photopolymerizable compound is retained inside this structure. As a result, the ink droplets are more likely to be pinned, so that combining of droplets can be prevented. It is preferable that the photopolymerizable compound and the wax dissolved in the ink be compatible with each other, in order to form the card house structure in the ink. When the phases of the photopolymerizable compound and the wax dissolved in the ink are separated from each other, the card house structure sometimes may be difficult to form.

Further, in order for the ink droplets to be stably discharged from an inkjet recording apparatus, it is desirable that the compatibility between the photopolymerizable compound and the wax be satisfactory in a sol-state ink (at high temperature).

Furthermore, in order to stably prevent the combining of droplets also during high-speed printing, it is desirable that the wax be crystallized quickly to form a firm card house structure after the ink droplets are landed on a recording medium.

Thus, the wax is preferably a compound having an alkyl group with 12 or more carbon atoms. In addition, while a linear alkyl group, a branched alkyl group, and a cyclic alkyl group can be employed as the alkyl group, the linear alkyl group and the branched alkyl group are preferred, and the linear alkyl group is more preferred from the viewpoint of easily forming the above-mentioned "card house structure."

Examples of the wax having a linear alkyl group with 12 or more carbon atoms include aliphatic ketone compounds, aliphatic ester compounds, higher fatty acids, higher alcohols, and fatty acid amides, which have a linear alkyl group with 12 or more carbon atoms.

Among those, aliphatic ketone compounds or aliphatic ester compounds are preferred, because waxes having polar groups such as —OH and —COOH at the terminal of the alkyl chain, such as fatty acid amide, do not have sufficient stability in a sol-state ink, and have a possibility of being precipitated or undergoing layer separation. That is, the wax is preferably a compound represented by the following General Formula (G1) or (G2):

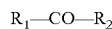  General Formula (G1):

  General Formula (G2):

It is preferable that hydrocarbon groups represented by $R_1$ and $R_2$ of General Formula (G1) each independently be aliphatic hydrocarbon groups containing a linear portion having 12 or more to 25 or less carbon atoms. When the aliphatic hydrocarbon groups represented by $R_1$ and $R_2$ contain a linear portion having carbon atoms less than 12, there is a case where the compounds represented by Formula (G1) may not have sufficient crystallinity. Further, there is a concern that it may not be possible to form a sufficient space for containing a photopolymerizable compound in the above-mentioned card house structure. On the other hand, when the aliphatic hydrocarbon groups contain a linear portion having carbon atoms more than 25, the melting point is too high. Accordingly, there is a concern that the compound may not be dissolved in the ink unless the ejection temperature of the ink is increased.

Examples of the aliphatic ketone compounds represented by General Formula (G1) include dilignoceryl ketone (C24-C24), dibehenyl ketone (C22-C22, melting point: 88° C.), distearyl ketone (C18-C18, melting point: 84° C.), dieicosyl ketone (C20-C20), dipalmityl ketone (C16-C16, melting point: 80° C.), dimyristyl ketone (C14-C14), dilauryl ketone (C12-C12, melting point: 68° C.), lauryl myristyl ketone (C12-C14), lauryl palmityl ketone (C12-C16), myristyl palmityl ketone (C14-C16), myristyl stearyl ketone (C14-C18), myristyl behenyl ketone (C14-C22), palmityl stearyl ketone (C16-C18), palmityl behenyl ketone (C16-C22), and stearyl behenyl ketone (C18-C22).

Examples of commercially available products of the compounds represented by General Formula (G1) include 18-Pentatriacontanon (manufactured by AlfaAeser), Hentriacontan-16-on (manufactured by AlfaAeser), and Kao Wax Ti (manufactured by Kao Corporation).

The aliphatic ketone compound may be contained singly or in combination in the actinic radiation-curable inkjet ink.

On the other hand, it is preferable that hydrocarbon groups represented by $R_3$ and $R_4$ of General Formula (G2) be aliphatic hydrocarbon groups containing a linear portion having 12 or more to 26 or less carbon atoms, although the hydrocarbon groups are not particularly limited. When the aliphatic hydrocarbon groups represented by $R_3$ and $R_4$ contain a linear portion having 12 or more to 26 or less carbon atoms, the compounds represented by Formula (G2) have satisfactory crystallinity and thus easily form the card house structure, in the same manner as the compounds represented by General Formula (G1). Further, the melting point of the wax is not increased excessively.

Examples of the aliphatic ester compounds represented by Formula (G2) include behenyl behenate (C21-C22, melting point: 70° C.), icosyl icosanoate (C19-C20), stearyl stearate (C17-C18, melting point: 60° C.), palmityl stearate (C17-C16), lauryl stearate (C17-C12), cetyl palmitate (C15-C16, melting point: 54° C.), stearyl palmitate (C15-C18), myristyl myristate (C13-C14, melting point: 43° C.), cetyl myristate (C13-C16, melting point: 50° C.), octyl dodecyl myristate (C13-C20), stearyl oleate (C17-C18), stearyl erucate (C21-C18), stearyl linolate (C17-C18), behenyl oleate (C18-C22), myricyl cerotate (C25-C16), stearyl montanate (C27-C18), behenyl montanate (C27-C22), arachidyl linolate (C17-C20), and palmityl triacontanate (C29-C16).

Examples of commercially available products of the aliphatic ester compounds represented by Formula (G2) include UNISTAR-M-2222SL (manufactured by NOF Corporation), EXCEPARL SS (manufactured by Kao Corporation, melting point: 60° C.), EMALEX CC-18 (manufactured by Nihon Emulsion Co., Ltd.), AMREPS PC (manufactured by Kokyu Alcohol Kogyo Co., Ltd.), EXCEPARL MY-M (manufactured by Kao Corporation), SPERMACETI (manufactured by NOF Corporation), and EMALEX CC-10 (manufactured by Nihon Emulsion Co., Ltd.). It is often the case that these commercially available products are mixtures of two or more types, and thus the commercially available products may be separated and/or purified as necessary. The aliphatic ester compound may be contained singly or in combination in the actinic radiation-curable inkjet ink.

The amount of the wax contained in the actinic radiation-curable inkjet ink is preferably 1.0 to 10.0 mass %, and more preferably 1.0 to 7.0 mass %, based on the total mass of the ink. When the amount of the wax is less than 1.0 mass %, there is a case where the liquid component of the actinic radiation-curable inkjet ink may be unlikely to be spread sufficiently on the surface of a pigment, and thus bubble nuclei on the surface of the pigment may not be sufficiently removed. In addition, there is also a concern that it may not be possible to allow ink droplets to undergo gelation (or sol-gel phase transition) sufficiently. On the other hand, when the amount of the wax exceeds 10 mass %, there is a concern that the wax may not be dissolved in the ink sufficiently, causing the ejection properties of the ink droplets to be lowered.

<Other Components>

The actinic radiation-curable inkjet ink may further contain other components, as necessary. Other components may be various additives, or other resins. Examples of the additives include surfactants, leveling additives, matting agents, UV absorbers, IR absorbers, antibacterial agents, and basic compounds that serve to increase the storage stability of the ink. Examples of the basic compounds include basic alkali metal compounds and basic alkali earth metal compounds, and basic organic compounds such as amines. Examples of other resins include resins for adjusting the physical properties of a cured film; examples thereof include polyester resins, polyurethane resins, vinyl resins, acrylic resins, rubber resins, and waxes.

<Physical Properties of Ink>

In order to enhance the degassing properties in the degassing step to be described later and the dischargeability of the ink droplets of the actinic radiation-curable inkjet ink, the viscosity of the ink at high temperature is preferably equal to or lower than a certain value. Specifically, the viscosity at 80° C. of the actinic radiation-curable inkjet ink is preferably 3 to 20 mPa·s. On the other hand, in order to prevent the combining of neighboring dots, the ink viscosity of the actinic radiation-curable inkjet ink at room temperature after landing is preferably equal to or higher than a certain value. Specifically, the ink viscosity at 25° C. is preferably 1,000 mPa·s or higher.

In particular, when an actinic radiation-curable inkjet ink contains the wax, the actinic radiation-curable inkjet ink undergoes a temperature-induced reversible sol-gel phase transition. Since the actinic radiation-curable inkjet ink is a liquid (sol) at high temperature (e.g., about 80° C.), the ink can be discharged from a recording head in a sol state. Once the actinic radiation-curable inkjet ink is discharged at high temperature, ink droplets (dots) are landed on a recording medium, and then undergo gelation by natural cooling. Thus, combining of neighboring dots is prevented to enhance the image quality.

The gelation temperature of the actinic radiation-curable inkjet ink containing the wax is preferably 30° C. or higher to lower than 100° C., and more preferably 50° C. or higher to 65° C. or lower. The reason why the above range is preferable is as follows. When the gelation temperature of the ink is too high, gelation easily occurs at the time of ejection, thus making the ejection properties more likely to be lowered. On the other hand, when the gelation temperature of the ink is too low, the ink after landed on a recording medium does not undergo gelation quickly. It is noted that the gelation temperature is a temperature when fluidity is lowered by gelation of the ink in a sol state in a process of cooling the sol-state ink.

The viscosity at 80° C., the viscosity at 25° C. and gelation temperature of the actinic radiation-curable inkjet ink can be determined by measuring a temperature change in dynamic viscoelasticity of the ink using a rheometer. Specifically, a temperature change curve of the viscosity at the time when the ink is heated to 100° C. and cooled to 20° C. under conditions including a shear rate of 11.7 (1/s) and a temperature decrease rate of 0.1° C./s is obtained. Further, the viscosity at 80° C. and the viscosity at 25° C. can be determined by reading the viscosities at 80° C. and 25° C., respectively, in the temperature change curve of the viscosity. The gelation temperature can be determined as a temperature at which the viscosity is 200 mPa·s in the temperature change curve of the viscosity.

As for the rheometer, stress control type rheometer Physica MCR series manufactured by Anton Paar, Ltd. can be used. The diameter of the corn plate can be 75 mm, and the corn angle can be 1.0°.

2. Inkjet Recording Method

The inkjet recording method of the present invention includes at least the steps of: (1) introducing an inkjet ink into a depressurized space inside an inkjet recording apparatus to degass the inkjet ink at an ink temperature of 50° C. or higher to lower than 120° C.; (2) discharging ink droplets of the degassed actinic radiation-curable inkjet ink from a recording head to land the ink droplets onto a recording medium; and (3) irradiating the ink droplets landed on the recording medium with actinic radiation to cure the ink droplets.

The actinic radiation-curable inkjet ink can be the above-described actinic radiation-curable inkjet ink.

<Step (1)>

The actinic radiation-curable inkjet ink inside an inkjet recording apparatus is degassed inside a depressurized space of the inkjet recording apparatus. The ink temperature during this period is set at 50° C. or higher to lower than 120° C. In this step, either the entire space or only a part of the space may be depressurized. Examples of the method of degassing the ink include (i) introducing the ink into a depressurization tank to remove air bubbles from the ink, and (ii) disposing a hollow fiber inside the space and depressurizing the inside of the hollow fiber to remove air bubbles from the ink.

Hereinafter, these methods will be described, but the method of the present invention is not construed to be limited thereto.

Method of (i)

One example of the method of degassing an ink is a method of introducing an ink into a depressurization tank. The temperature of the ink inside the depressurization tank is 50 to 120° C., preferably 70 to 110° C., and more preferably 80 to 100° C. When the temperature of the ink inside the depressurization tank is within the above-mentioned range, the ink viscosity is lowered, so that air bubbles are removed more easily from the ink. The method for controlling the temperature of the ink inside the depressurization tank to be within a desired range is not particularly limited; the ink temperature may be adjusted by a heater or the like provided outside or inside the depressurization tank. In addition, an ink to be introduced into the depressurization tank may be warmed in advance before introducing the ink to adjust the temperature inside the tank to a desired temperature. Any ink temperature is possible as long as one of the temperature of the ink before being introduced into the depressurization tank and the temperature of the ink after being discharged from the depressurization tank satisfies the above-mentioned temperature range; it is preferable that both of them satisfy the above-mentioned temperature range.

The viscosity of the ink inside the depressurization tank is preferably 1 to 1,000 mPa·s, and more preferably 1 to 100 mPa·s. When the ink viscosity is within the above-mentioned range, air bubbles are removed more easily from the ink. The ink viscosity is measured by a rheometer, as described above.

Further, the vacuum inside the depressurization tank is appropriately selected depending on the type of the ink, the viscosity of the ink inside the depressurization tank, the flow rate of the ink, or the like, and is preferably less than −90 kPa, more preferably −90 to −98 kPa, and even more preferably −95 to −98 kPa. When the vacuum inside the depressurization tank is less than −90 kPa, air bubbles in the ink are more likely to be released. Further, the above-described actinic radiation-curable inkjet ink contains a photopolymerizable compound having a molecular weight of 250 to 1,500, and this compound is hard to volatilize even when the vacuum is less than −90 kPa. Accordingly, the composition of the actinic radiation-curable inkjet ink is less likely to be changed even after the degassing step. When the vacuum is more than −90 kPa, the ink is prevented from volatilizing, while the capacity of removing air bubbles is lowered. Consequently, a printing apparatus capable of high-speed printing, for example, with a printing speed (relative speed between a printing apparatus and a recording medium during printing) of 50 m/min or higher is required to increase the size of the depressurized space. When the vacuum is less than −98 kPa, the amount of ink volatilization is increased, and thus the composition of the ink is changed, so that the image quality is more likely to be lowered.

The method for removing air bubbles in the ink is not particularly limited, and can be a method of storage in a depressurization tank for a set period of time, or the like; degassing is performed by the movement of air bubbles inside the ink in a direction toward the interface between the ink and the air. Therefore, when the surface area of the ink is increased, air bubbles are more likely to be released from the inside of the ink. Thus, it is preferable to perform a treatment for increasing the surface area of the ink inside the depressurization tank.

One example of the method for increasing the surface area of the ink is a method of spraying the ink into the depressurization tank. When the ink is sprayed, the surface area of the ink becomes very large, so that air bubbles in the ink are more likely to be released. As illustrated in FIG. 1, the spray of the ink is performed by expelling the ink from nozzle 71 having a large number of holes, while applying pressure to the ink. Nozzle 71 can be a nozzle having a shape similar to that of a typical fluid spray nozzle. Further, the pressurization to the ink is performed by a pump or the like.

In this method, the most of air bubbles contained in the ink move toward air layer 81 side until ink droplets fall on the bottom surface of pressurization tank 70 or the surface of ink 80 stored at the lower portion of pressurization tank 70. Then, the air having moved toward air layer 81 side is discharged out of pressurization tank 70 by depressurization pump 72.

The diameter of the ink droplets expelled from nozzle 71 is not particularly limited, and typically can be 30 to 500 μm. The diameter of the ink droplets is adjusted by the diameter of the hole of nozzle 71, or the like.

Figure 2:
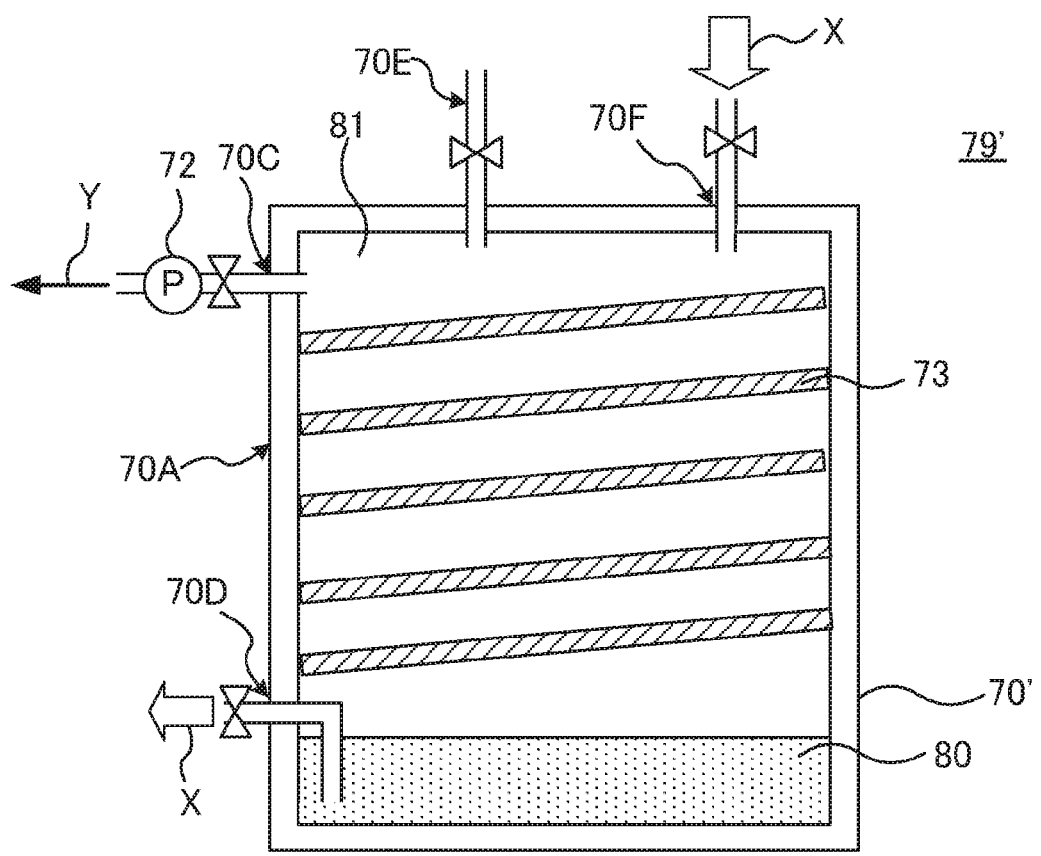
FIG. 2 is a schematic diagram illustrating another example of a depressurization degassing module.

Another example of the method for increasing the surface area of the ink may be a method of allowing the ink to flow little by little along channel 73 for the ink provided inside pressurization tank 70', as illustrated in FIG. 2. In this method, the ink moves along channel 73, and thus the surface area of the ink is increased. Further, the ink moves inside the depressurization tank over time, and thus air bubbles are more likely to be released toward air layer 81 side from the inside of the ink. The air having moved toward air layer 81 side is discharged out of pressurization tank 70' by pressurization pump 72.

Any concave member can be employed for channel 73, and the cross-sectional shape, the depth, and the width thereof are also appropriately selected. When channel 73 is deeper, a large amount of the ink is more likely to flow at once, so that the ink is introduced into pressurization tank 70' efficiently. On the other hand, when channel 73 is shallower, the surface area of the ink is larger, so that air bubbles in the ink are more likely to be released. In addition, when channel 73 is wider, it becomes easier to introduce a large amount of the ink at once.

The structure of channel 73 inside pressurization tank 70' is not particularly limited, and any structure thereof is possible as long as channel 73 is installed to be inclined moderately relative to a horizontal plane, such that the ink reaches the bottom side of pressurization tank 70' from ink inlet 70F over time. The angle between channel 73 and the horizontal plane is appropriately selected depending on the length of channel 73, the viscosity of the ink, and the like. Further, it is preferable that channel 73 be formed into a spiral shape or a zig-zag shape inside pressurization tank 70' from the viewpoint of increasing the length of channel 73. The length of channel 73 and the flow rate, flow velocity, or the like of the ink flowing along channel 73 are not particularly limited, and are appropriately selected depending on the viscosity of the ink, or the like.

Other examples of the method for increasing the surface area of the ink also include a method of vibrating the ink stored in the pressurization tank and a method of stirring the stored ink. By vibrating or stirring the ink stored in the pressurization tank, the area of the interface between the ink and the air layer becomes larger. Further, the vibration and the stirring allow air bubbles to be easily expelled toward the air layer side from the inside of the ink. Any method of vibrating or stirring the ink is possible as long as the method does not easily allow the air to enter the inside of the stored ink, and the method can be a known vibration method or stirring method. For example, vibration by ultrasonic, stirring by a stirring blade, or the like can be employed.

Method of (ii)

Another example of the method of degassing an ink is a degassing method using a hollow fiber incorporated in an inkjet recording apparatus. Here, the hollow fiber is hollow-shaped (straw-shaped) fiber that allows a gas to permeate therethrough but does not allow a liquid to permeate therethrough. Examples of a material for the hollow fiber include: polyolefin resins such as polypropylene and poly(4-methyl-1-pentene); silicone resins such as polydimethylsiloxane or a copolymer thereof, and fluorine resins such as PTFE and vinylidene fluoride. Among those, from the viewpoints of easily increasing surface energy by heating, and of easily enhancing degassing efficiency, silicone resins or fluorine resins are preferred.

The properties of a hollow fiber sidewall film may be a porous film, a non-porous film (homogeneous film without a hole), or a composite film in combination of these films. Since the actinic radiation-curable inkjet ink is likely to wet the surface of hollow fibers, the hollow fiber is preferably a non-porous film.

The hollow internal diameter of the hollow fiber can be about 50 to 500 μm. The film thickness of the hollow fiber (thickness of the hollow fiber sidewall film) can be about 10 to 150 μm.

Figure 4:
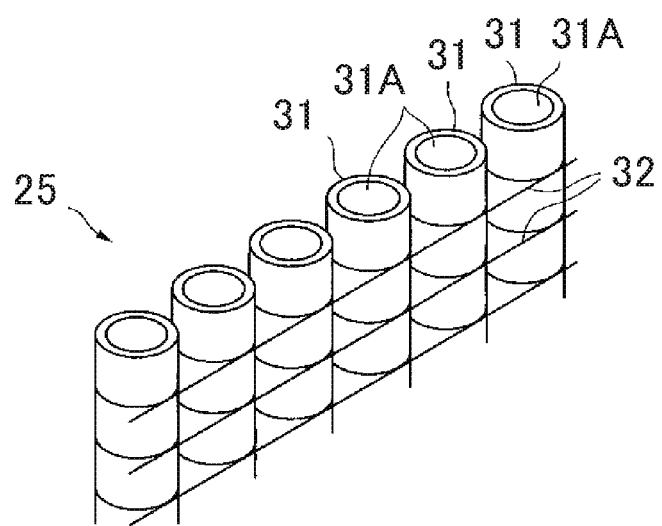
FIG. 4 is a schematic diagram illustrating an example of a hollow fiber aggregate.

The hollow fiber can be used as a hollow fiber aggregate. The hollow fiber aggregate either may be a filler of a single long hollow fiber; or a bundle or weave of a plurality of hollow fibers. Examples of the bundle of a plurality of hollow fibers include a bundle body in which a plurality of hollow fibers are bundled so as to be arranged in parallel to one another in the longitudinal direction. Examples of the weave of a plurality of hollow fibers include a sheet into which a plurality of hollow fibers are weaved together in a woven manner, as illustrated in FIG. 4. Such a sheet can be used as a wound body wound around an axis parallel to the longitudinal direction of the plurality of hollow fibers.

Among those, the sheet into which a plurality of hollow fibers are weaved together in a woven manner is preferred, from the viewpoints of easily enhancing the degassing efficiency, for the reason of every ink being easily transmitted through meshes between hollow fibers due to the fine meshes between the hollow fibers; and of easily obtaining a certain strength or higher even from soft hollow fibers.

The effective film area of the hollow fiber aggregate can be set at about 0.1 to 5 $m^2$, preferably about 0.3 to 2 $m^2$, and more preferably about 0.5 to 1 $m^2$. The effective film area of the hollow fiber aggregate can be defined as the surface area per hollow fiber ($m^2$/piece)×the number (piece) of the hollow fibers.

The method of removing air bubbles in the ink using the hollow fibers can be a method in which an ink is allowed to flow outside hollow fibers (outside of the hollow) disposed inside a space warmed to a certain temperature, with the inside of the hollow fibers (inside of the hollow) being depressurized for degassing (external reflux system); or can be a method in which an ink is allowed to flow inside hollow fibers (inside of the hollow), with the outside of the hollow fibers (outside of the hollow) being depressurized for degassing (internal reflux system). It is noted that the external reflux system is preferred, from the viewpoint of less pressure loss of the ink, or the like.

The temperature of the ink inside the space in which the hollow fibers are disposed is 50° C. or higher to 120° C. or lower, preferably 60° C. or higher to 120° C. or lower, and more preferably 80° C. or higher to 100° C. or lower. When the ink temperature in degassing the ink using the hollow fibers is too low, the surface energy of the hollow fibers is not increased sufficiently, and thus the ink is unlikely to be spread to the hollow fibers sufficiently, making the degassing efficiency unlikely to be increased. On the other hand, when the degassing temperature is too high, thermal radicals are generated in the ink, or the pigment dispersibility is destabilized, and thus the storage stability of the ink is more likely to be lowered. Any ink temperature is possible as long as one of the temperature of the ink before being introduced into the space in which the hollow fibers are disposed and the temperature of the ink after being discharged from the space in which the hollow fibers are disposed satisfies the above-mentioned temperature range; it is preferable that both of them satisfy the above-mentioned temperature range.

Figure 3:
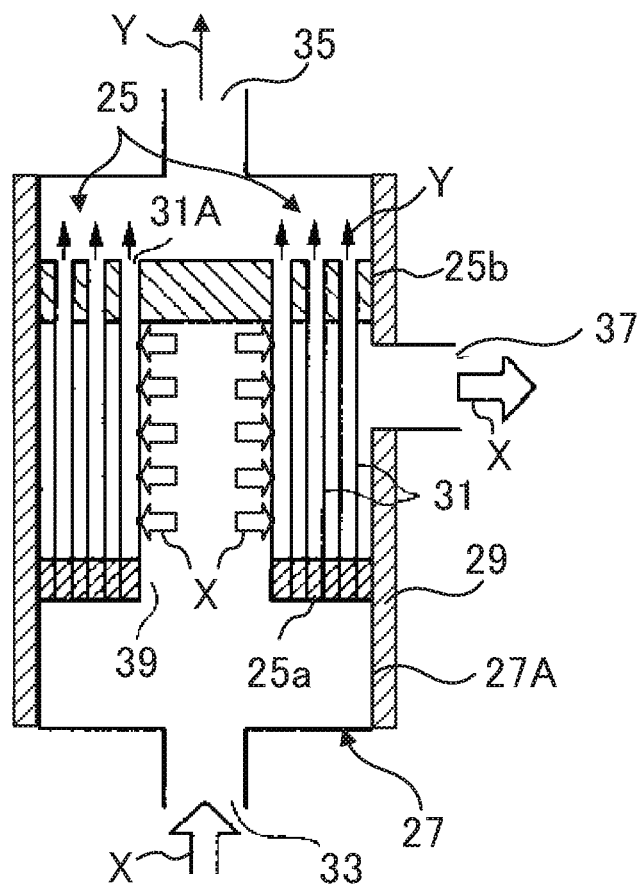
FIG. 3 is a schematic diagram illustrating an example of a hollow fiber degassing module of an external reflux system.

The temperature of the ink inside the space in which the hollow fibers are disposed can be adjusted by a heating means of a hollow fiber degassing module to be described later. The heating means can be, for example, jacket heater 29 provided on the outer periphery of housing 27 of the hollow fiber degassing module, as illustrated in FIG. 3. Further, an ink to be introduced into the hollow fiber degassing module may be warmed in advance before introducing the ink to adjust the temperature of the ink inside the hollow fiber degassing module to a desired temperature.

<Step (2)>

The ink droplets of the actinic radiation-curable inkjet ink degassed as described above are discharged from a recording head. The actinic radiation-curable inkjet ink immediately before discharging is heated to 60 to 100° C., and preferably 60 to 80° C., from the viewpoint of enhancing the ejection properties of the ink droplets. When the temperature of the actinic radiation-curable inkjet ink immediately before discharging is too low, the viscosity of the ink becomes too high, or the ink containing a wax undergoes gelation inside the recording head or on the surface of a nozzle, thus making the ejection properties of the ink droplets more likely to be lowered. On the other hand, when the temperature of the actinic radiation-curable inkjet ink immediately before discharging is too high, ink components are more likely to be deteriorated.

The actinic radiation-curable inkjet ink is heated at the recording head of the inkjet recoding apparatus, an ink channel connected to the recording head, the above-mentioned degassing module for the degassing step, or the like.

The amount of droplet per drop discharged from each nozzle of the recording head is preferably 0.5 to 10 pl, while it depends on the resolution of an image, more preferably 0.5 to 4 pl, and even more preferably 0.5 to 2.5 pl in order to form a high-definition image. When the actinic radiation-curable inkjet ink contains a wax, the ink droplets undergo sol-gel transition quickly. Therefore, the combining of the ink after landing is less likely to occur even in the above-mentioned amount of droplets, so that a high-definition image is formed in a stable manner. In addition, according to the method of the present invention, air bubbles in the ink are sufficiently removed in the foregoing step, and thus high discharge stability is obtained.

The ink droplets landed on the recording medium may be cooled. When the actinic radiation-curable inkjet ink contains a wax, the ink droplets landed on the recording medium undergo gelation more quickly due to sol-gel phase transition. Accordingly, when the ink droplets landed on the recording medium are cooled, the ink droplets do not become spread and is pinned. Further, the gelation allows ink viscosity to be increased, thus making oxygen less likely to enter the ink droplets, so that the curing of a photopolymerizable compound is less likely to be inhibited by oxygen.

The recording medium may be either paper or a resin film. Examples of the paper include printing coated paper and printing art paper. Further, examples of the resin film include a polyethylene terephthalate film, a polypropylene film, and a vinyl chloride film.

In the case where the actinic radiation-curable inkjet ink contains a wax, the temperature of the recording medium at the time when the ink droplets are landed is preferably set at a temperature 10 to 20° C. lower than the gelation temperature of this ink. When the temperature of the recording medium is too low, the ink droplets undergo gelation and are pinned excessively fast. Therefore, leveling of the ink droplets does not occur sufficiently, which may cause the glossiness of an image to be lowered. On the other hand, when the temperature of the recording medium is too high, the ink droplets are less likely to undergo gelation, so that neighboring dots of the ink droplets may be mixed with one another. By appropriately adjusting the temperature of the recording medium, it becomes possible to achieve both a moderate level of leveling that does not allow neighboring dots of the ink droplets to be mixed with one another and appropriate pinning.

The conveyance speed of the recording medium is preferably 100 to 1,500 mm/s. As the conveyance speed is increased, the image forming speed is increased, which is preferable. However, when the conveyance speed is too high, the image quality is lowered, or photocuring of an ink (to be described later) becomes insufficient.

<Step (3)>

By irradiating the ink droplets landed on the recording medium with actinic radiation, the photopolymerizable compound contained in the ink droplets is crosslinked or polymerized to cure the ink droplets.

The actinic radiation to be emitted to the ink droplets adhered to the recording medium is preferably an ultraviolet ray from an LED light source. Specific examples thereof include 395 nm water-cooled LED manufactured by Heraeus Ltd. Examples of the common ultraviolet ray light source include a metal halide lamp; however, the use of an LED as a light source prevents ink droplets from being dissolved due to the radiation heat of the light source; i.e. prevents the occurrence of curing deficiency on the surface of a cured film of the ink droplets.

An LED light source is installed such that it provides ultraviolet rays of from 360 to 410 nm with peak illuminance of from 0.5 to 10 $W/cm^2$, and more preferably from 1 to 5 $W/cm^2$ on the surface of an image. The amount of light to be emitted to an image is adjusted to be preferably less than 500 $mJ/cm^2$, and more preferably less than 350 $mJ/cm^2$, in order to prevent the irradiation of the ink droplets with radiation heat.

In order to prevent the combining of neighboring ink droplets, the irradiation of the ink droplets with actinic radiation is preferably performed within 10 seconds, preferably within 0.001 to 5 seconds, and more preferably within 0.01 to 2 seconds after the ink droplets are adhered to the recording medium. The irradiation with actinic radiation is preferably performed after the ink droplets are discharged from all the recording heads accommodated in a head carriage.

Further, the ink droplets may be cured by moving a recording medium and the light source of the actinic radiation relatively with each other at a velocity of 50 m/min or higher. In the method of the present invention, air bubbles are sufficiently removed from the actinic radiation-curable inkjet ink, as described above. That is, the amount of dissolved oxygen in the actinic radiation-curable inkjet ink is low. Therefore, there is less oxygen inhibition during ink curing, which makes it also possible to perform curing at a fast speed as described above.

3. Inkjet Recording Apparatus

The inkjet recording method of the present invention can be performed using an inkjet recording apparatus of actinic radiation-curable inkjet type.

The inkjet recording apparatus of the present invention includes a recording head that discharges an actinic radiation-curable inkjet ink, an ink tank that accommodates the actinic radiation-curable inkjet ink to be supplied to the recording head, a degassing module that allows communication between the recording head and the ink tank to degass the actinic radiation-curable inkjet ink supplied from the ink tank, and an irradiation section that irradiates ink droplets discharged from the recording head with actinic radiation.

The inkjet recording apparatus of actinic radiation-curable inkjet type includes line recording type (single pass recording type) and serial recording type. Although it may be selected depending on desired resolution or recording speed of images, the line recording type (single pass recording type) is preferred from the viewpoint of high-speed recording.

Figure 6A:
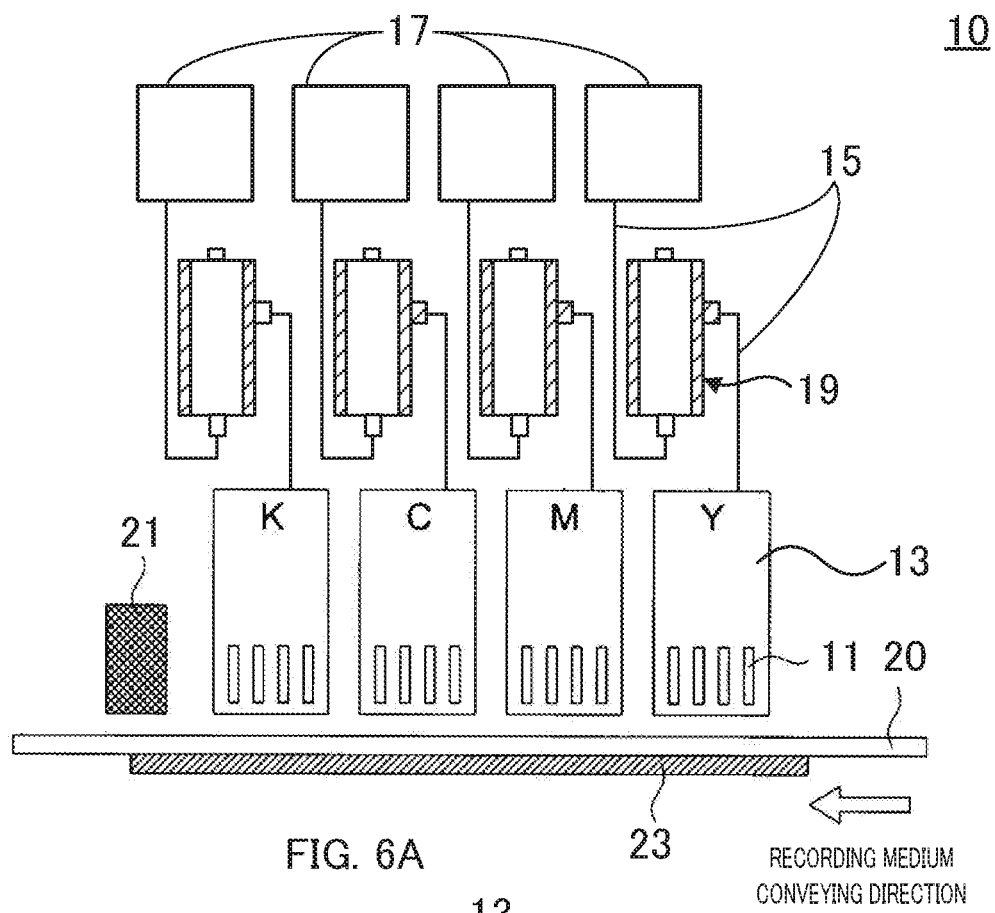
FIGS. 6A and 6B illustrate an example of a configuration of a main part of a line recording type inkjet recording apparatus.
Figure 6B:
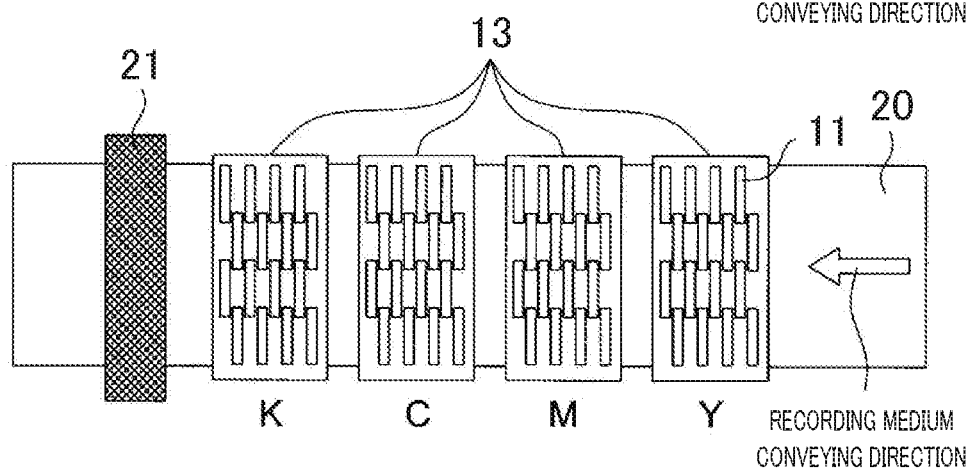

FIGS. 6A and 6B illustrate an example of a configuration of a main part of a line recording type inkjet recording apparatus. FIG. 6A is a side view, and FIG. 6B is a top view. As illustrated in FIGS. 6A and 6B, inkjet recording apparatus 10 may have head carriage 13 that accommodates a plurality of recording heads 11, ink tank 17 that stores an ink supplied through ink channel 15, degassing module 19 that allows communication between ink tank 17 and head carriage 13 to degass the ink supplied from ink tank 17, actinic radiation irradiation section 21 that covers the entire width of recording medium 20 and is arranged downstream of head carriage 13 (recording medium conveying direction (direction indicated by f)), and temperature control section 23 installed on the lower surface of recording medium 20.

<Head Carriage>

Head carriage 13 is fixedly arranged so as to cover the entire width of recording medium 20, and accommodates a plurality of recording heads 11. The respective head carriages 13 accommodate recording heads 11 for colors which are different from one another.

Recording head 11 is designed to receive an ink. For example, an ink may be supplied from an ink cartridge or the like (not illustrated) that is attached in a freely-mountable manner to inkjet recording apparatus 10 directly or by an ink supply means (not illustrated).

The number of recording heads 11 arranged in the conveying direction of recording medium 20 is determined based on the nozzle density of recording head 11 and the resolution of a printed image. For example, when an image having the resolution of 1440×1440 dpi is formed by using recording head 11 with a droplet volume of 2 pl and a nozzle density of 360 dpi, four recording heads 11 can be arranged in a shifted manner relative to the conveying direction of recording medium 20 (direction indicated by f). Further, when an image having the resolution of 720×720 dpi is formed by using recording head 11 with a droplet volume of 6 pl and a nozzle density of 360 dpi, two recording heads 11 can be arranged in a shifted manner. As described herein, dpi represents the number of ink droplets (dots) per 2.54 cm.

<Ink Tank and Ink Channel>

Ink tank 17 is connected to head carriage 13 via ink channel 15 and degassing module 19. Ink channel 15 is a passage for supplying an ink in ink tank 17 to head carriage 13. For stable discharge of ink droplets, ink tank 17, ink channel 15, head carriage 13, and recording head 11 are designed such that the ink present therein is heated to a predetermined temperature.

<Degassing Module>

Degassing module 19 is connected to ink tank 17 and head carriage 13, respectively, via ink channel 15. The ink supplied from ink tank 17 is degassed in degassing module 19, and then sent to head carriage 13.

One example of degassing module 19 is a module (depressurization degassing module) including a depressurization tank, a depressurization pump for degassing the depressurization tank, a means for increasing the surface area of the ink inside the depressurization tank, and a heating means for heating the depressurization tank.

FIG. 1 is a schematic diagram illustrating an example of a depressurization degassing module. Arrows X indicate the flow of an ink; and arrow Y indicates the flow of air bubbles. Depressurization degassing module 79 is a module including depressurization tank 70, depressurization pump 72 for degassing the depressurization tank, nozzle 71 for spraying the ink into the depressurization tank, and a heating means (not illustrated) for heating the depressurization tank.

Depressurization tank 70 includes housing main body 70A, nozzle inlet 70B for installing nozzle 71 therein, suction port 70C for vacuuming the inside of housing main body 70A, and ink discharge port 70D that discharges the ink having been degassed.

Suction port 70C is connected to depressurization pump 72. On the other hand, ink discharge port 70D is connected to head carriage 13 via ink channel 15. Further, pressurization tank 70 may also be provided with atmosphere release tube 70E or the like for adjusting the pressure inside depressurization tank 70.

Nozzle 71 is connected to ink tank 17 via ink channel 15. A pressurizing means such as a pressure pump is provided as necessary between ink channel 15 and nozzle 71. While, in FIG. 1, nozzle 71 is disposed so as to spray the ink downward in the gravity direction, nozzle 71 may also be provided so as to spray the ink in a desired direction such as upward in the gravity direction or the horizontal direction (sideward).

On the other hand, depressurization pump 72 is connected to suction port 70C of depressurization tank 70. By discharging the air inside housing main body 70A using depressurization pump 72, the inside of housing main body 70A is designed to be depressurized.

A heating means (not illustrated) can be provided, for example, to cover the outer peripheral surface of housing main body 70A of depressurization tank 70; however, the heating means is not limited thereto, and may also be provided inside housing main body 70A. The heating means allows the temperature of the ink inside housing main body 70A to be adjusted to a predetermined temperature. It is noted that there is a case where the temperature of the ink inside housing main body 70A may not increase to a desired range immediately after the operation of the inkjet apparatus. Thus, the judgment whether or not the temperature of the ink inside housing main body 70A is within the desired range is conducted after the elapse of a certain period of time from the operation of the inkjet apparatus.

In pressurization degassing module 79 thus configured, the ink supplied from ink tank 17 is sprayed into housing main body 70A from nozzle 71, after the inside of housing main body 70A is depressurized to a desired vacuum by depressurization pump 72. At that time, the temperature of the ink inside housing main body 70A is adjusted by a heating means (not illustrated), for example. Since the inside of housing main body 70A is depressurized, air bubbles contained in the sprayed ink move immediately toward air layer 81 side. Then, the air is discharged out of depressurization tank 70 via suction port 70C (see arrow Y). On the other hand, degassed ink 80 is stored at the bottom portion of housing main body 70A, and is delivered from ink discharge port 70D toward head carriage 13 side via ink channel 15.

FIG. 2 is a schematic diagram illustrating another example of a depressurization degassing module. Arrows X indicate the flow of an ink; and arrow Y indicates the flow of air bubbles. Depressurization degassing module 79' is a module including depressurization tank 70', depressurization pump 72 for degassing the depressurization tank, channel 73 for allowing the ink to flow little by little inside the depressurization tank 70', and a heating means (not illustrated) for heating the depressurization tank.

Depressurization tank 70' includes housing main body 70A, nozzle inlet 70F for introducing the ink, suction port 70C for vacuuming the inside of housing main body 70A, and ink discharge port 70D that discharges the ink having been degassed. Suction port 70C is connected to depressurization pump 72. On the other hand, ink discharge port 70F is connected to the ink tank via ink channel 15. Further, ink discharge port 70D is connected to head carriage 13 via ink channel 15. Depressurization tank 70' may also be provided with atmosphere release tube 70E or the like for adjusting the pressure inside depressurization tank 70'.

Channel 73 is installed to form an angle relative to the horizontal direction, such that the ink is guided to the vicinity of the bottom portion of housing main body 70A from ink inlet 70F (ink channel 15). The channel 73 can be formed into a spiral shape or a zig-zag shape continuously or intermittently on the wall surface of or inside housing main body 70A.

Further, depressurization pump 72 is connected to suction port 70C of depressurization tank 70'. By discharging the air inside housing main body 70A using depressurization pump 72, the inside of housing main body 70A is designed to be depressurized. On the other hand, the heating means (not illustrated) can be provided, for example, to cover the outer peripheral surface of housing main body 70A of depressurization tank 70'; however, the heating means is not limited thereto, and may also be provided inside housing main body 70A. The heating means allows the temperature of the ink inside housing main body 70A to be adjusted to a predetermined temperature. As described above, there is a case where the temperature of the ink inside housing main body 70A may not increase to a desired range immediately after the operation of the inkjet apparatus. Thus, the judgment whether or not the temperature of the ink inside housing main body 70A is within the desired range is conducted after the elapse of a certain period of time from the operation of the inkjet apparatus.

In pressurization degassing module 79' thus configured, the ink is introduced from ink inlet 70F, after the inside of housing main body 70A is depressurized to a desired vacuum by depressurization pump 72. The ink introduced into housing main body 70A moves slowly toward the bottom portion side of housing main body 70A along channel 73. At that time, the inside of housing main body 70A is depressurized, and thus air bubbles contained in the ink moving along channel 73 move toward air layer 81 side. Then, the air is discharged via suction port 70C (see arrow Y). On the other hand, degassed ink 80 is stored at the bottom portion of housing main body 70A, and is delivered from ink discharge port 70D toward head carriage 13 side via ink channel 15.

On the other hand, another example of degassing module 19 may be a module (hollow fiber degassing module) including a hollow fiber aggregate, a housing that houses the hollow fiber aggregate, and a heating means that heats the inside of the housing. The hollow fiber degassing module may employ either an internal reflux system or an external reflux system. The hollow fibers may be the above-mentioned hollow fibers. The heating means is not particularly limited, and may be a jacket heater or the like provided around the outer periphery of the housing.

FIG. 3 is a schematic diagram illustrating an example of hollow fiber degassing module 89 of an external reflux system. Arrows X indicate the flow of an ink; and arrows Y indicate the flow of air bubbles. As illustrated in FIG. 4, hollow fiber degassing module 89 includes hollow fiber aggregate 25, housing 27 that accommodates hollow fiber aggregate 25, and jacket heater 29 provided around the periphery of housing 27.

Hollow fiber aggregate 25 may be preferably a wound body obtained by winding a sheet in which a plurality of hollow fibers 31 are arranged so as to be parallel to one another in the longitudinal direction (e.g., sheet or the like in which a plurality of hollow fibers 31 arranged so as to be parallel to one another in the longitudinal direction are woven with warps 32, illustrated in FIG. 4) around an axis parallel to the longitudinal direction of hollow fibers 31. Hollow fibers 31 may be the above-mentioned hollow fibers.

At one end 25a (end portion on the side of ink inlet 33 to be described later) of hollow fiber aggregate 25, gaps between hollow fibers 31 and hollow fiber holes 31A are both sealed with a sealing resin or the like so as not to allow an ink to flow into hollow fiber aggregate 25. On the other hand, at the other end 25b (end portion on the side of suction port 35 to be described later) of hollow fiber aggregate 25, gaps between hollow fibers 31 are sealed with a sealing resin or the like, but holes 31A of hollow fibers 31 are opened without being sealed. Thus, it becomes possible to depressurize the inside of the hollows (the inside of holes 31A) of hollow fibers 31.

Housing 27 includes cylindrical housing main body 27A, ink inlet 33 that introduces an ink into housing main body 27A, suction port 35 for vacuuming the inside of housing main body 27A, and ink discharge port 37 that discharges the ink having been in contact with hollow fiber aggregate 25. At the center inside housing main body 27A, is formed center hole 39 surrounded by hollow fiber aggregate 25 and extending parallel to the longitudinal direction of hollow fibers 31. One end (end portion on the side of suction port 35) of center hole 39 is sealed with a sealing resin or the like.

Jacket heater 29 (heating means) may be provided so as to cover the outer peripheral surface of housing main body 27A. Thus, it becomes possible to adjust the temperature of the ink inside housing main body 27A to a predetermined temperature.

In hollow fiber degassing module 89 thus configured, an ink introduced into housing main body 27A from ink inlet 33 flows through center hole 39; permeates the sidewall surface of center hole 39 to flow into hollow fiber aggregate 25 (see arrows X); and flows over the outer surface of hollow fibers 31 to be discharged from ink discharge port 37. The ink is introduced into housing main body 27A from ink inlet 33, and flows through center hole 39. The ink flowing through center hole 39 flows into hollow fiber aggregate 25 from the sidewall surface of center hole 39 (arrows X); and flows over the outer surface of hollow fibers 31. On the other hand, since the inside of the hollows (inside of holes 31A) of hollow fibers 31 is depressurized, air bubbles inside the ink permeate hollow fibers 31 to be sucked into the hollow (into holes 31A). The air bubbles sucked into the hollows of hollow fibers 31 are discharged out of the other ends of hollow fibers 31 (see arrows Y), and are discharged via suction port 35.

In this hollow fiber degassing module 89, the ink inside housing main body 27A is heated to a certain temperature or higher with jacket heater 29, and therefore the surface energy of the outer surface of hollow fibers 31 is increased, thus making the ink likely to be spread on the outer surface of hollow fibers 31. Thus, it becomes possible to remove air bubbles contained in the ink efficiently. The ink with air bubbles having been removed is discharged out of ink discharge port 37 of hollow fiber degassing module 89.

It is noted that the above-described hollow fiber degassing module of the degassing module is not limited to the external reflux system, and a hollow fiber degassing module of the internal reflux system may also be employed.

Figure 5:
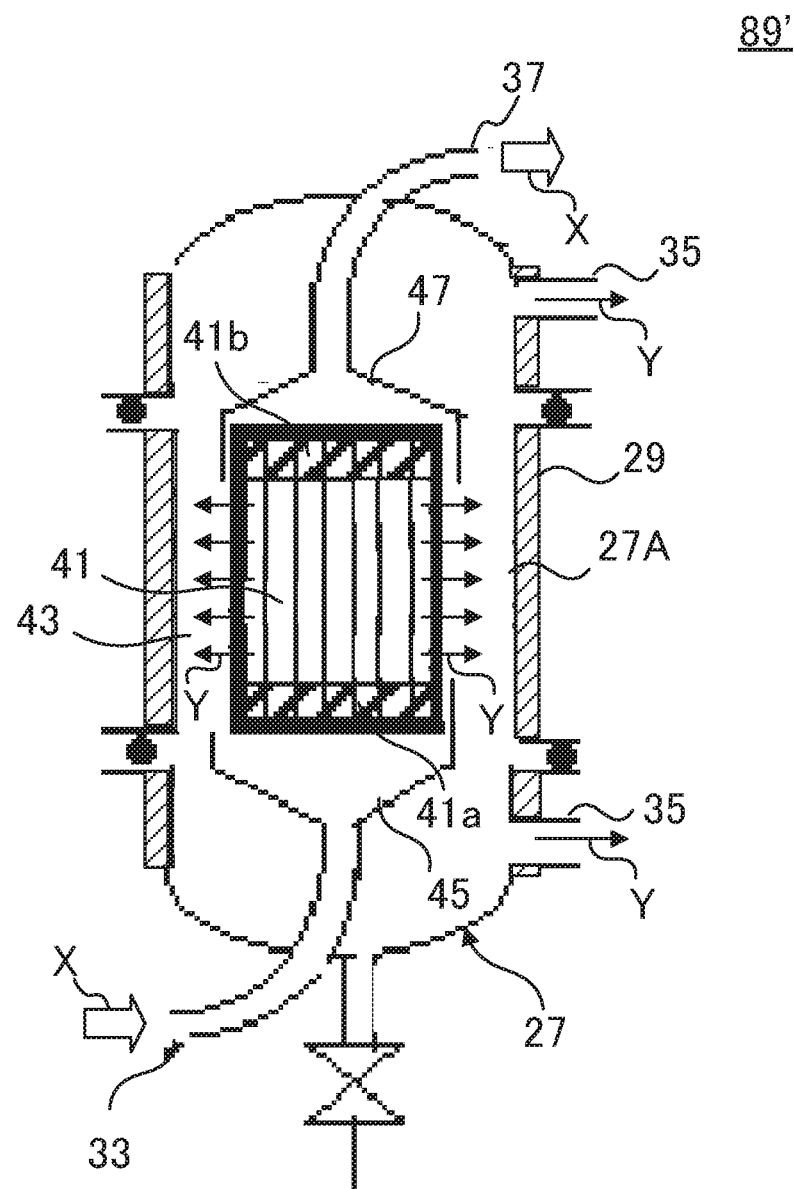
FIG. 5 is a schematic diagram illustrating an example of a hollow fiber degassing module of an internal reflux system.

FIG. 5 is a schematic diagram illustrating an example of a hollow fiber degassing module of an internal reflux system. Arrows X indicate the flow of an ink; and arrows Y indicate the flow of air bubbles. As illustrated in FIG. 5, hollow fiber degassing module 89' includes hollow fiber aggregate 41, housing 27 that accommodates hollow fiber aggregate 41, and jacket heater 29 provided around the periphery of housing 27.

Hollow fiber aggregate 41 is, as described above, a wound body obtained by winding a sheet in which a plurality of hollow fibers 31 are arranged so as to be parallel to one another in the longitudinal direction around an axis parallel to the longitudinal direction of hollow fibers 31; or a bundle body in which a plurality of hollow fibers 31 are bundled so as to be in parallel to one another in the longitudinal direction. The outer peripheral surface of hollow fiber aggregate 41 is covered with cylindrical porous case 43.

One end 41a (end portion on the side of ink inlet 33) of hollow fiber aggregate 41 is fixed to introducing connection port 45 with a fixing member (hatched area); and the other end 41b (end portion on the side of ink discharge port 37) is fixed to discharging connection port 47 with a fixing member (hatched area). Thus, the ink does not leak out of hollow fiber aggregate 41. Introducing connection port 45 is connected to ink inlet 33; and discharging connection port 47 is connected to ink discharge port 37.

Housing 27 includes housing main body 27A, and suction port 35 for vacuuming the inside of housing main body 27A. Thus, it becomes possible to depressurize the inside of housing main body 27A.

Thus, an ink introduced into hollow fiber degassing module 89' is introduced into hollow fiber aggregate 41 via introducing connection port 45 from ink inlet 33; and flows through the inside of the hollows (inside of holes 31A) of hollow fibers 31 (see arrow X). On the other hand, since the outside of hollow fiber aggregate 41 inside housing main body 27A is depressurized, air bubbles inside the ink flowing through the inside of the hollows of hollow fibers 31 permeate the sidewall film of hollow fibers 31 to be sucked out of the sidewall film, and are discharged via suction port 35 (refer to arrows Y).

Also in this hollow fiber degassing module 89', the ink inside housing main body 27A is heated to a certain temperature or higher with jacket heater 29, to thereby increase the surface energy of the inner surface of the hollows of hollow fibers 31, thus making the ink likely to be spread in the hollows of hollow fibers 31. Thus, it becomes possible to remove air bubbles contained in the ink efficiently. The ink with air bubbles having been removed is discharged out of ink discharge port 37 via discharging connection port 47.

<Actinic Radiation Irradiation Section>

Actinic radiation irradiation section 21 covers the entire width of recording medium 20, and is arranged downstream of head carriage 13 in the conveying direction of the recording medium. Actinic radiation irradiation section 21 irradiates the droplets which have been discharged from recording head 11 and landed on the recording medium with light so as to cure the droplets.

Temperature control section 23 is installed on the lower surface of recording medium 20, and maintains recording medium 20 at a predetermined temperature.

Temperature control section 23 may be, for example, any of the various heaters.

<Image Forming Method>

Hereinafter, an image forming method using line recording type inkjet recording apparatus 10 will be described. Recording medium 20 is conveyed between head carriage 13 and temperature control section 23 of inkjet recording apparatus 10. The temperature of recording medium 20 is adjusted to a predetermined temperature by means of temperature control section 23.

On the other hand, an ink inside ink tank 17 is introduced into degassing module 19 via ink channel 15. In degassing module 19, the ink is degassed by various degassing means, and is supplied to recording head 11 inside head carriage 13.

Next, high-temperature ink droplets are discharged from recording head 11 of head carriage 13, and are adhered (landed) onto recording medium 20. Then, actinic radiation irradiation section 21 irradiates the ink droplets adhered onto recording medium 20 with actinic radiation to cure the ink droplets.

The total ink droplet film thickness after the curing is preferably 2 to 25 m. "Total ink droplet film thickness" is a maximum value of the film thickness of ink droplets drawn on a recording medium.

<Other Image Forming Apparatuses>

Figure 7:
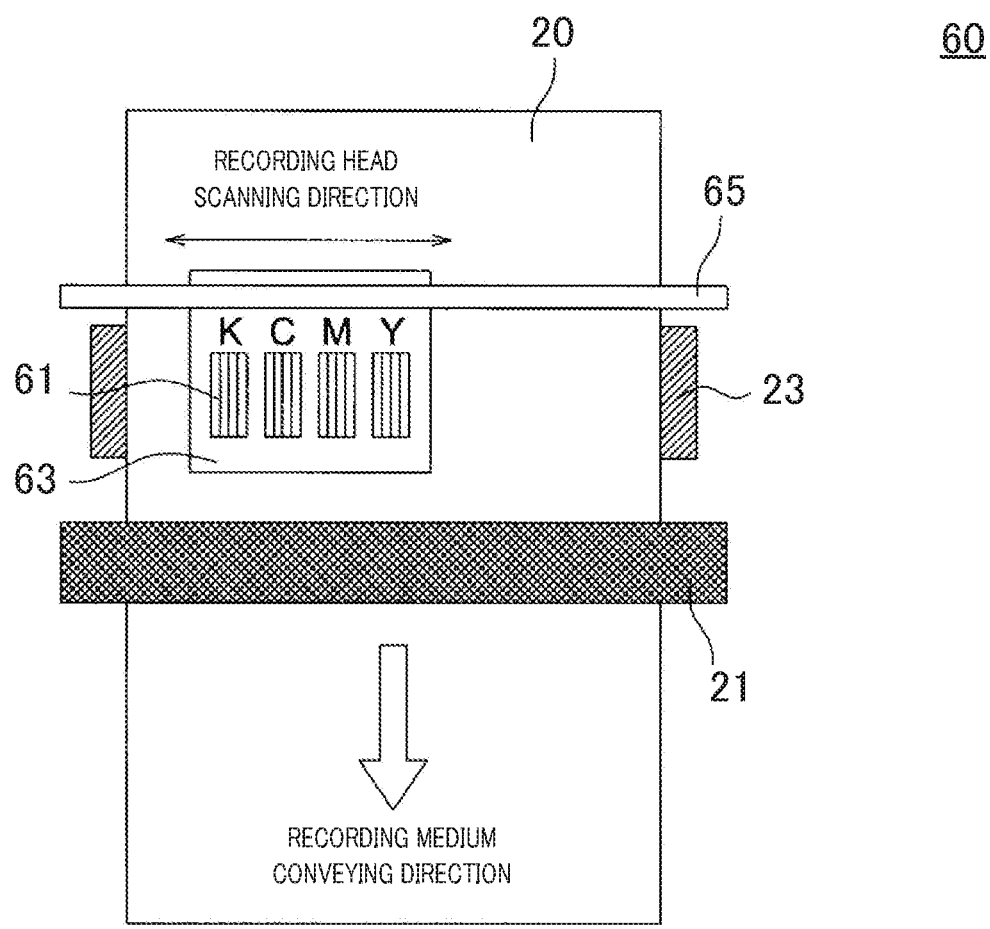
FIG. 7 illustrates an example of a configuration of a main part of a serial recording type inkjet recording apparatus.

FIG. 7 illustrates an example of a configuration of a main part of serial recording type inkjet recording apparatus 60. As illustrated in FIG. 7, inkjet recording apparatus 60 can be configured in substantially the same manner as that illustrated in FIGS. 6A and 6B except that inkjet recording apparatus 60 has head carriage 63 provided to have a width narrower than the entire width of the recording medium and accommodating a plurality of recording heads 61 instead of head carriage 13 fixedly arranged so as to cover the entire width of the recording medium, and guide section 65 for moving head carriage 63 in the width direction of recording medium 20. The same signs are given to members having the same or similar functions as those in FIGS. 6A and 6B.

In serial recording type inkjet recording apparatus 60, head carriage 63 discharges ink droplets from recording head 61 accommodated in head carriage 63 while moving in the width direction of recording medium 20 (direction indicated by w) along guide section 65. Once head carriage 63 moves completely in the width direction of recording medium 20 (for each pass), recording medium 20 is fed in the conveying direction (direction indicated by f), and actinic radiation irradiation section 21 emits actinic radiation. Except these operations, an image is recorded in almost the same manner as the above-mentioned line recording type inkjet recording apparatus 10.

EXAMPLES

Hereinafter, the present invention will be described in more detail by way of Examples. The scope of the present invention is not construed to be limited by these Examples.

In Examples and Comparative Examples, materials shown in the following table were used.

APG-200, 10.0 parts by mass of NK ester A-400, 10.0 parts by mass of NK ester A-600, 28.8 parts by mass of Miramaer M3160, and 20.0 parts by mass of SR494 as photopolymerizable compounds; 0.05 parts by mass of KF 352 (manufactured by Shin-Etsu Chemical Company) as a surfactant; 4.0 parts by mass of DAROCURE TPO, 2.0 parts by mass of IRGACURE 819, 2.0 parts by mass of SPEEDCURE ITX (manufactured by DKSH Japan), and 3.0 parts by mass of SPEEDCURE EDB (manufactured by DKSH Japan) as photopolymerization initiators; and 0.2 parts by mass of UV10 (manufactured by BASF Japan, Ltd.) as a polymer-

TABLE 1

| | Name of Product | Name of Compound | Molecular Weight |
|---|---|---|---|
| Photopolymerizable Compound | V-CAP (manufactured by ISP Investments, Inc.) | N-Vinylcaprolactam | 139 |
| | Viscoat#192 (manufactured by Osaka Organic Chemical Industry, Ltd.) | Phenoxyethyl Acrylate | 192 |
| | IBXA (manufactured by Osaka Organic Chemical Industry, Ltd.) | Isobornyl Acrylate | 208 |
| | A-HD-N (manufactured by Shin-Nakamura Chemical Co., Ltd.) | 1,6-Hexane Diacrylate | 226 |
| | APG-200 (manufactured by Shin-Nakamura Chemical Co., Ltd.) | Tripropylene Glycol Diacrylate | 300 |
| | MK Ester A-400 (manufactured by Shin-Nakamura Chemical Co., Ltd.) | Polyethylene Glycol 400 Diacrylate | 508 |
| | MK Ester A-600 (manufactured by Shin-Nakamura Chemical Co., Ltd.) | Polyethylene Glycol 600 Diacrylate | 742 |
| | MiramaerM3160 (manufactured by Miwon Specialty Chemical Co., Ltd.) | 6EO-Modified Trimethylolpropane Triacrylate | 560 |
| | SR494 (manufactured by Sartomer Company, Inc.) | 4EO-Modified Trimethylolpropane Triacrylate | 693 |
| | NK Oligo U-108A (manufactured by Shin-Nakamura Chemical Co., Ltd.) | Urethane Acrylate | 1600 |
| Wax | Stearone (manufactured by Kao Corporation) | Distearyl Ketone | |
| Surfactant | KF352 (manufactured by Shin-Etsu Chemical Company) | | |
| Photopolymerization Initiator | DAROCURE TPO (manufactured by BASF Japan, Ltd.) | | |
| | IRGACURE 819 (manufactured by BASF Japan, Ltd.) | | |
| | SPEEDCURE ITX (manufactured by DKSH Japan) | | |
| | SPEEDCURE EDB (manufactured by DKSH Japan) | | |
| Polymerization Inhibitor | UV10 (manufactured by BASF Japan, Ltd.) | | |
| Pigment | Pigment Red 122 (manufactured by Dainichiseika Color & Chemicals Mfg. Co., Ltd., Chromo Fine Red 6122JC) | | |
| | Pigment Yellow 185 (manufactured by BASF Japan, Ltd., Isoindoline Yellow Pigment) | | |
| Pigment Dispersant | efka7701 (manufactured by BASF Japan, Ltd.) | | |

<Preparation of Pigment Dispersion Liquid>
(Yellow Pigment Dispersion Liquid)

8 parts by mass of efka7701 and 71 parts by mass of APG-200 were charged into a stainless beaker, and stirred for 1 hour under heating on a hot plate at 65° C. for dissolution. After this liquid mixture was cooled to room temperature, 20 parts by mass of Pigment Yellow 185 was added. This liquid mixture was charged into a glass bottle together with 200 g of zirconia beads having a diameter of 0.5 mm, and the glass bottle was tightly sealed, followed by being subjected to a dispersion treatment for 8 hours in a paint shaker. Thereafter, the zirconia beads were removed to prepare a yellow pigment dispersion liquid.

(Magenta Pigment Dispersion Liquid)

A magenta pigment dispersion liquid was prepared in the same manner as the yellow pigment dispersion liquid except that the pigment was changed to a magenta pigment, Pigment Red 122.

Example 1

Preparation of Yellow Ink 12.0 parts by mass of the above-mentioned yellow pigment dispersion liquid as a pigment; 8.0 parts by mass of ization inhibitor were mixed, and stirred at 80° C. The resultant solution was filtered with a Teflon® 3 μm membrane filter (manufactured by ADVANTEC, Ltd.) to prepare a yellow ink.

<Preparation of Magenta Ink>

A magenta ink was prepared in the same manner as the yellow ink except that the composition thereof was changed to that shown in Table 2.

<Image Forming Method>

Monochromatic images were formed using the line recording type inkjet recording apparatus illustrated in FIGS. 6A and 6B. An ink supply system of the inkjet recording apparatus is composed of an ink tank, a supply pipe, a degassing module, a sub-ink tank immediately before a head, piping with a filter, and a piezo head (recording head) being communicated in this order. The above-described yellow ink and magenta ink were supplied respectively to ink tanks of the inkjet apparatus. Then, the system from the ink tank to the recording head of the inkjet recording apparatus was heated to 90° C. Further, the space inside the degassing module was depressurized to 97 kPa. The ink-supplying rate to the degassing module was set at 200 cc/min.

Further, the above-mentioned recording head in the inkjet recording apparatus is an inkjet recording head having 1,776 nozzles, manufactured by Konica Minolta, Inc., and the resolution was set at 600 dpi. The application voltage was adjusted such that the single droplet volume was 3.5 pl and the droplet rate was 7 m/sec, and 2 heads were arranged in a staggered manner to record an image having the resolution of 1200×1200 dpi. The term dpi stands for the number of dots per 2.54 cm. Image formation was performed under the environment of 23° C. and 55% RH.

(Degassing Module)

The degassing module was configured such that ink channel 73 was formed into a spiral shape inside cylindrical depressurization tank 70', as illustrated in FIG. 2. Channel 73 was composed of a concave member (concave cross-sectional shape: semicircular shape) made of a fluorine resin. Further, the total area of the upper surface of the channel (the total area of the interface between the ink flowing through the channel and the air layer) was set at 300 $cm^2$. The temperature of the ink inside depressurization tank 70' was adjusted by a jacket heater (not illustrated) disposed around the outer periphery of depressurization tank 70' and by a heating means (not illustrated) provided near ink inlet 70F of depressurization tank 70'. At that time, the temperature of the ink inside depressurization tank 70' (temperature of the ink to be introduced into depressurization tank 70') was set at 90° C. On the other hand, the vacuum inside depressurization tank 70' was adjusted by depressurization pump 72 to be set at −90 kPa.

<Evaluation>

With regard to an image recording method using the above-mentioned yellow ink and magenta ink, ink discharge stability, ink curability, and an image output product were evaluated. Each evaluation method is as follows. The results are shown in Table 2.

<Evaluation of Ink Discharge Stability>

The above-mentioned recording head was used to perform continuous discharge (drive) under the conditions: a droplet volume of 3.5 pl, a droplet rate of 7 m/sec, an ejection frequency of 40 kHz, and an printing rate of 100%. Then, the number of nozzles not having ejected the ink 1 minute, 5 minutes, and 10 minutes after the start of the drive were counted.

A: The number of omitted nozzles was less than 2

B: The number of omitted nozzles was 2 or more to less than 10

C: The number of omitted nozzles was 10 or more to less than 50

D: The number of omitted nozzles was 50 or more

<Evaluation of Ink Curability>

Printing was performed with the adhering amount of 9 $g/m^2$ of a magenta ink on printing coated paper (OK KINFUJI, metric basis weight: 104.7 $g/m^2$, manufactured by Oji Paper Co., Ltd.) to form magenta solid images. After the image formation, an LED lamp (manufactured by Heraeus Ltd., 8 $W/cm^2$, 395 nm, water-cooled unit) arranged downstream of the inkjet recording apparatus was used to irradiate the printing coated paper with ultraviolet rays to cure the ink. The distance between the LED lamp and the printing coated paper during the irradiation of ultraviolet rays was set at 30 mm. Further, the relative speed between the LED lamp and the printing coated paper during the irradiation of ultraviolet rays was set at 60 m/min.

Evaluations of the surface tackiness of printed matters were performed by palpating the resultant solid images with a finger. As for the evaluations of rub resistance of printed matters, in accordance with the procedure described in "JIS Standards K5701-1 6.2.3 Rub Resistance Test," 2 $cm^2$-sized piece cut out from printing coated paper (OK KINFUJI, metric basis weight: 104.7 $g/m^2$, manufactured by Oji Paper Co., Ltd.) was placed on the printed surface, and they were rubbed together while applying a 800 g load. Thereafter, the degree of color migration to the printing coated paper was visually observed to evaluate the curability.

A: There was no color migration, and no surface tackiness, either

B: There was slight color migration, but no surface tackiness

C: There was slight color migration, and slight surface tackiness

D: There was color migration, and surface tackiness in addition

<Evaluation of Image Quality>

Printing was performed with the adhering amount of 6 $g/m^2$ of each of a yellow ink and a magenta ink on printing coated paper (OK KINFUJI, metric basis weight: 104.7 $g/m^2$, manufactured by Oji Paper Co., Ltd.) and on a polypropylene film (manufactured by Okamoto Industries, Inc.) to form red-colored solid images. After the image formation, an LED lamp (manufactured by Heraeus Ltd., 8 $W/cm^2$, 395 nm, water-cooled unit) arranged downstream of the inkjet recording apparatus was used to irradiate the printing coated paper with ultraviolet rays to cure the ink having been landed on the printing coated paper. The distance between the LED lamp and the printing coated paper during the irradiation of ultraviolet rays was set at 30 mm. Further, the relative speed between the LED lamp and the printing coated paper during the irradiation of ultraviolet rays was set at 60 m/min.

The glossy feeling of solid images printed on the printing coated paper and the polypropylene film was evaluated by visual observation as follows:

A: The glossiness is uniform, and the granularity is low

B: The glossiness is slightly nonuniform, but the granularity is low

C: The glossiness is nonuniform, but the granularity is low

D: The glossiness is nonuniform, and the granularity is also high

Examples 2 to 6

A yellow ink and a magenta ink were each prepared in the same manner as Example 1 except that the compositions of the yellow ink and the magenta ink were changed to those shown in Table 2. As used herein, the unit of numerical values indicating the compositions in Table 2 is "parts by mass."

The yellow ink and magenta ink were used to output images with an inkjet recording apparatus similar to that in Example 1. The evaluation results of ink discharge stability, ink curability, and image output products are shown in Table 2.

TABLE 2

| | | Example 1 Y | Example 1 M | Example 2 Y | Example 2 M | Example 3 Y | Example 3 M |
|---|---|---|---|---|---|---|---|
| Pigment Dispersion Liquid | Yellow Pigment Dispersion Liquid | 12.0 | | 12.0 | | 12.0 | |
| | Magenta Pigment Dispersion Liquid | | 15.0 | | 15.0 | | 15.0 |
| Photopolymerizable Compound | IBXA (manufactured by Osaka Organic Chemical Industry, Ltd.): Molecular Weight 208 | | | | | | |
| | APG-200 (manufactured by Shin-Nakamura Chemical Co., Ltd.): Molecular Weight 300 | 8.0 | 8.0 | 8.0 | 8.0 | 8.0 | 8.0 |
| | MK Ester A-400 (manufactured by Shin-Nakamura Chemical Co., Ltd.): Molecular Weight 508 | 10.0 | 10.0 | 10.0 | 10.0 | 10.0 | 10.0 |
| | MK Ester A-600 (manufactured by Shin-Nakamura Chemical Co., Ltd.): Molecular Weight 742 | 10.0 | 10.0 | 10.0 | 10.0 | 10.0 | 10.0 |
| | Miramaer M3160 (manufactured by Miwon Specialty Chemical Co., Ltd.): Molecular Weight 560 | 28.8 | 25.8 | 27.8 | 24.8 | 25.8 | 22.8 |
| | SR494 (manufactured by Sartomer Company, Inc.): Molecular Weight 693 | 20.0 | 20.0 | 20.0 | 20.0 | 20.0 | 20.0 |
| | NK Oligo U-108A (manufactured by Shin-Nakamura Chemical Co., Ltd.): Molecular Weight 1,600 | | | | | | |
| Wax | Stearone (manufactured by Kao Corporation) | | | 1.0 | 1.0 | 3.0 | 3.0 |
| Surfactant | KF352 (manufactured by Shin-Etsu Chemical Company) | 0.05 | 0.05 | 0.05 | 0.05 | 0.05 | 0.05 |
| Photopolymerization Initiator | DAROCURE TPO (manufactured by BASF Japan, Ltd.) | 4.0 | 4.0 | 4.0 | 4.0 | 4.0 | 4.0 |
| | IRGACURE 819 (manufactured by BASF Japan, Ltd.) | 2.0 | 2.0 | 2.0 | 2.0 | 2.0 | 2.0 |
| | SPEEDCURE ITX (manufactured by DKSH Japan) | 2.0 | 2.0 | 2.0 | 2.0 | 2.0 | 2.0 |
| | SPEEDCURE EDB (manufactured by DKSH Japan) | 3.0 | 3.0 | 3.0 | 3.0 | 3.0 | 3.0 |
| Polymerization Inhibitor | UV10 (manufactured by BASF Japan, Ltd.) | 0.2 | 0.2 | 0.2 | 0.2 | 0.2 | 0.2 |
| | Total | 100 | 100 | 100 | 100 | 100 | 100 |
| | Total Amount of Monomers having a Molecular Weight of 400 to 1,500 in Ink (mass %) | 68.8 | 65.8 | 67.8 | 64.8 | 65.8 | 62.8 |
| | Temperature of Ink in Depressurized Space (° C.) | 90 | | 90 | | 90 | |
| | Vacuum of Depressurized Space (-kPa) | 97 | | 97 | | 97 | |
| | Ejection Temperature (° C.) | 80 | | 80 | | 80 | |
| Evaluation Results | Discharge Stability 1 Minute After | A | | A | | A | |
| | 5 Minutes After | B | | A | | A | |
| | 10 Minutes After | B | | B | | A | |
| | Curability | B | | A | | A | |
| | Image Quality | C | | B | | A | |

| | | Example 4 Y | Example 4 M | Example 5 Y | Example 5 M | Example 6 Y | Example 6 M |
|---|---|---|---|---|---|---|---|
| Pigment Dispersion Liquid | Yellow Pigment Dispersion Liquid | 12.0 | | 12.0 | | 12.0 | |
| | Magenta Pigment Dispersion Liquid | | 15.0 | | 15.0 | | 15.0 |
| Photopolymerizable Compound | IBXA (manufactured by Osaka Organic Chemical Industry, Ltd.): Molecular Weight 208 | 12.0 | 12.0 | 24.0 | 24.0 | | |
| | APG-200 (manufactured by Shin-Nakamura Chemical Co., Ltd.): Molecular Weight 300 | 15.0 | 12.0 | 15.0 | 12.0 | | |
| | MK Ester A-400 (manufactured by Shin-Nakamura Chemical Co., Ltd.): Molecular Weight 508 | 5.0 | 5.0 | | | 15.0 | 15.0 |
| | MK Ester A-600 (manufactured by Shin-Nakamura Chemical Co., Ltd.): Molecular Weight 742 | 8.0 | 8.0 | | | 5.0 | 5.0 |
| | Miramaer M3160 (manufactured by Miwon Specialty Chemical Co., Ltd.): Molecular Weight 560 | 6.8 | 6.8 | 1.8 | 1.8 | 33.8 | 30.8 |
| | SR494 (manufactured by Sartomer Company, Inc.): Molecular Weight 693 | 20.0 | 20.0 | 18.0 | 18.0 | 20.0 | 20.0 |
| | NK Oligo U-108A (manufactured by Shin-Nakamura Chemical Co., Ltd.): Molecular Weight 1,600 | 5.0 | 5.0 | 8.0 | 8.0 | | |
| Wax | Stearone (manufactured by Kao Corporation) | 5.0 | 5.0 | 10.0 | 10.0 | 3.0 | 3.0 |
| Surfactant | KF352 (manufactured by Shin-Etsu Chemical Company) | 0.05 | 0.05 | 0.05 | 0.05 | 0.05 | 0.05 |
| Photopolymerization Initiator | DAROCURE TPO (manufactured by BASF Japan, Ltd.) | 4.0 | 4.0 | 4.0 | 4.0 | 4.0 | 4.0 |
| | IRGACURE 819 (manufactured by BASF Japan, Ltd.) | 2.0 | 2.0 | 2.0 | 2.0 | 2.0 | 2.0 |
| | SPEEDCURE ITX (manufactured by DKSH Japan) | 2.0 | 2.0 | 2.0 | 2.0 | 2.0 | 2.0 |
| | SPEEDCURE EDB (manufactured by DKSH Japan) | 3.0 | 3.0 | 3.0 | 3.0 | 3.0 | 3.0 |
| Polymerization Inhibitor | UV10 (manufactured by BASF Japan, Ltd.) | 0.2 | 0.2 | 0.2 | 0.2 | 0.2 | 0.2 |
| | Total | 100 | 100 | 100 | 100 | 100 | 100 |
| | Total Amount of Monomers having a Molecular Weight of 400 to 1,500 in Ink (mass %) | 39.8 | 39.8 | 27.8 | 27.8 | 73.8 | 70.8 |
| | Temperature of Ink in Depressurized Space (° C.) | 90 | | 90 | | 90 | |
| | Vacuum of Depressurized Space (-kPa) | 97 | | 97 | | 97 | |
| | Ejection Temperature (° C.) | 80 | | 80 | | 80 | |

TABLE 2-continued

| Evaluation Results | Discharge Stability | 1 Minute After | A | A | A |
|---|---|---|---|---|---|
| | | 5 Minutes After | A | A | A |
| | | 10 Minutes After | A | A | B |
| | Curability | | A | A | A |
| | Image Quality | | B | C | A |

As shown in Table 2, inkjet inks containing a photopolymerizable compound having a molecular weight of 250 to 1,500 were able to be discharged stably from the inkjet recording apparatus (Examples 1 to 6). It is deduced that, in these Examples, the ink was sufficiently degassed by the degassing module inside the inkjet recording apparatus, thus allowing a piezo head to be not easily clogged with air bubbles.

However, when there were less photopolymerizable compounds having a molecular weight of 250 to 1,500, with low molecular weight components being increased (Examples 4 and 5), the evaluation of images tended to be lowered. It is deduced that, when the amount of components having a molecular weight of less than 250 was increased, the low molecular weight components undesirably volatilized during degassing under depressurization, causing the composition of the inks to be changed. On the other hand, when components having a molecular weight of more than 1,500 were increased, the discharge stability was slightly lowered. It is deduced that this is because degassing was not easily performed due to the increase in ink viscosity during the degassing using the depressurization degassing module.

Further, when a wax was contained in the ink, the image quality tended to be increased (Examples 2 and 3). It is deduced that this is because the surface of a pigment contained in the ink was more likely to be wet, allowing bubble nuclei present on the surface of the pigment to be easily removed. Furthermore, it is deduced that the increase in pinning properties of ink droplets also became the factor of the increased image quality.

Examples 7 to 11

A yellow ink and a magenta ink were each prepared in the same manner as Example 1 except that the compositions of the yellow ink and the magenta ink were changed to those shown in Table 3. As used herein, the unit of numerical values indicating the compositions in Table 3 is "parts by mass."

The yellow ink and magenta ink were used to output images with an inkjet recording apparatus similar to that in Example 1. However, the ink temperature and the vacuum inside the depressurization degassing module included in the inkjet recording apparatus were set as values shown in Table 3. The evaluation results of ink discharge stability, ink curability, and image output products in each Example are shown in Table 3.

TABLE 3

| | | Example 7 | | Example 8 | | Example 9 | |
|---|---|---|---|---|---|---|---|
| Pigment Dispersion Liquid | Yellow Pigment Dispersion Liquid | 12.0 | | 12.0 | | 12.0 | |
| | Magenta Pigment Dispersion Liquid | | 15.0 | | 15.0 | | 15.0 |
| Photopolymerizable Compound | IBXA (manufactured by Osaka Organic Chemical Industry, Ltd.): Molecular Weight 208 | | | | | | |
| | APG-200 (manufactured by Shin-Nakamura Chemical Co., Ltd.): Molecular Weight 300 | 8.0 | 8.0 | 8.0 | 8.0 | 8.0 | 8.0 |
| | MK Ester A-400 (manufactured by Shin-Nakamura Chemical Co., Ltd.): Molecular Weight 508 | 10.0 | 10.0 | 10.0 | 10.0 | 10.0 | 10.0 |
| | MK Ester A-600 (manufactured by Shin-Nakamura Chemical Co., Ltd.): Molecular Weight 742 | 10.0 | 10.0 | 10.0 | 10.0 | 10.0 | 10.0 |
| | Miramaer M3160 (manufactured by Miwon Specialty Chemical Co., Ltd.): Molecular Weight 560 | 25.8 | 22.8 | 25.8 | 22.8 | 25.8 | 22.8 |
| | SR494 (manufactured by Sartomer Company, Inc.): Molecular Weight 693 | 20.0 | 20.0 | 20.0 | 20.0 | 20.0 | 20.0 |
| | NK Oligo U-108A (manufactured by Shin-Nakamura Chemical Co., Ltd.): Molecular Weight 1,600 | | | | | | |
| Wax | Stearone (manufactured by Kao Corporation) | 3.0 | 3.0 | 3.0 | 3.0 | 3.0 | 3.0 |
| Surfactant | KF352 (manufactured by Shin-Etsu Chemical Company) | 0.05 | 0.05 | 0.05 | 0.05 | 0.05 | 0.05 |
| Photopolymerization Initiator | DAROCURE TPO (manufactured by BASF Japan, Ltd.) | 4.0 | 4.0 | 4.0 | 4.0 | 4.0 | 4.0 |
| | IRGACURE 819 (manufactured by BASF Japan, Ltd.) | 2.0 | 2.0 | 2.0 | 2.0 | 2.0 | 2.0 |
| | SPEEDCURE ITX (manufactured by DKSH Japan) | 2.0 | 2.0 | 2.0 | 2.0 | 2.0 | 2.0 |
| | SPEEDCURE EDB (manufactured by DKSH Japan) | 3.0 | 3.0 | 3.0 | 3.0 | 3.0 | 3.0 |
| Polymerization Inhibitor | UV10 (manufactured by BASF Japan, Ltd.) | 0.2 | 0.2 | 0.2 | 0.2 | 0.2 | 0.2 |
| | Total | 100 | 100 | 100 | 100 | 100 | 100 |
| | Total Monomers having a Molecular Weight of 400 to 1,500 in wt % | 65.8 | 62.8 | 65.8 | 62.8 | 65.8 | 62.8 |
| | Temperature of Ink in Depressurized Space (° C.) | 70 | | 50 | | 120 | |
| | Vacuum of Depressurized Space (-kPa) | 97 | | 97 | | 97 | |
| | Ejection Temperature (° C.) | 80 | | 80 | | 80 | |
| Evaluation Results | Discharge Stability — 1 Minute After | A | | A | | A | |
| | 5 Minutes After | A | | B | | A | |
| | 10 Minutes After | B | | B | | A | |
| | Curability | A | | A | | A | |

TABLE 3-continued

| | | | | Example | |
|---|---|---|---|---|---|
| | | | | 10 | 11 |
| | Image Quality | A | A | B | |

| | | Example 10 | | Example 11 | |
|---|---|---|---|---|---|
| | | Yellow | Magenta | Yellow | Magenta |
| Pigment Dispersion Liquid | Yellow Pigment Dispersion Liquid | 12.0 | | 12.0 | |
| | Magenta Pigment Dispersion Liquid | | 15.0 | | 15.0 |
| Photopolymerizable Compound | IBXA (manufactured by Osaka Organic Chemical Industry, Ltd.): Molecular Weight 208 | | | | |
| | APG-200 (manufactured by Shin-Nakamura Chemical Co., Ltd.): Molecular Weight 300 | 8.0 | 8.0 | 8.0 | 8.0 |
| | MK Ester A-400 (manufactured by Shin-Nakamura Chemical Co., Ltd.): Molecular Weight 508 | 10.0 | 10.0 | 10.0 | 10.0 |
| | MK Ester A-600 (manufactured by Shin-Nakamura Chemical Co., Ltd.): Molecular Weight 742 | 10.0 | 10.0 | 10.0 | 10.0 |
| | Miramaer M3160 (manufactured by Miwon Specialty Chemical Co., Ltd.): Molecular Weight 560 | 25.8 | 22.8 | 25.8 | 22.8 |
| | SR494 (manufactured by Sartomer Company, Inc.): Molecular Weight 693 | 20.0 | 20.0 | 20.0 | 20.0 |
| | NK Oligo U-108A (manufactured by Shin-Nakamura Chemical Co., Ltd.): Molecular Weight 1,600 | | | | |
| Wax | Stearone (manufactured by Kao Corporation) | 3.0 | 3.0 | 3.0 | 3.0 |
| Surfactant | KF352 (manufactured by Shin-Etsu Chemical Company) | 0.05 | 0.05 | 0.05 | 0.05 |
| Photopolymerization Initiator | DAROCURE TPO (manufactured by BASF Japan, Ltd.) | 4.0 | 4.0 | 4.0 | 4.0 |
| | IRGACURE 819 (manufactured by BASF Japan, Ltd.) | 2.0 | 2.0 | 2.0 | 2.0 |
| | SPEEDCURE ITX (manufactured by DKSH Japan) | 2.0 | 2.0 | 2.0 | 2.0 |
| | SPEEDCURE EDB (manufactured by DKSH Japan) | 3.0 | 3.0 | 3.0 | 3.0 |
| Polymerization Inhibitor | UV10 (manufactured by BASF Japan, Ltd.) | 0.2 | 0.2 | 0.2 | 0.2 |
| | Total | 100 | 100 | 100 | 100 |
| | Total Monomers having a Molecular Weight of 400 to 1,500 in wt % | 65.8 | 62.8 | 65.8 | 62.8 |
| | Temperature of Ink in Depressurized Space (° C.) | 90 | | 90 | |
| | Vacuum of Depressurized Space (-kPa) | 80 | | 60 | |
| | Ejection Temperature (° C.) | 80 | | 80 | |
| Evaluation Results | Discharge Stability 1 Minute After | A | | B | |
| | 5 Minutes After | A | | B | |
| | 10 Minutes After | B | | B | |
| | Curability | A | | A | |
| | Image Quality | A | | A | |

As shown in Table 3, yellow inks of Examples 7 to 11 each have the same composition, and magenta inks of Examples 7 to 11 also each have the same composition. In these Examples 7 to 11, the ink temperature and the vacuum inside the depressurization degassing module differ from one another.

Here, when the temperature of the ink inside the depressurization degassing module became lowered, the discharge stability tended to be slightly lowered (Examples 7 and 8). It is deduced that the viscosity of the ink during degassing became increased, and thus the degree of degassing became lowered.

On the other hand, when the temperature of the ink inside the degassing module became increased, the evaluation of image quality was slightly lowered (Example 9). It is deduced that the component in the ink was more likely to volatilize during degassing, thus making the composition of the ink more likely to be changed.

Further, when the degree of depressurization inside the depressurization degassing module was lowered, the discharge stability tended to be lowered (Examples 10 and 11). It is deduced that this is because the low vacuum made it difficult to remove the air in the ink.

Comparative Examples 1 to 6

A yellow ink and a magenta ink were each prepared in the same manner as Example 1 except that the compositions of the yellow ink and the magenta ink were changed to those shown in Table 4. As used herein, the unit of numerical values indicating the compositions in Table 4 is "parts by mass."

The yellow ink and magenta ink were used to output images with an inkjet recording apparatus similar to that in Example 1. However, the ink temperature and the vacuum inside the depressurization degassing module included in the inkjet recording apparatus were set as values shown in Table 4. The evaluation results of ink discharge stability, ink curability, and image output products in each Example are shown in Table 4.

TABLE 4

| | | Comparative Example | | | | | |
|---|---|---|---|---|---|---|---|
| | | 1 | | 2 | | 3 | |
| Pigment Dispersion Liquid | Yellow Pigment Dispersion Liquid | 12.0 | | 12.0 | | 12.0 | |
| | Magenta Pigment Dispersion Liquid | | 15.0 | | 15.0 | | 15.0 |
| Photopolymerizable | V-CAP (manufactured by ISP | 15.0 | 15.0 | 15.0 | 15.0 | 20.0 | 20.0 |

TABLE 4-continued

| Compound | | | | | | | | |
|---|---|---|---|---|---|---|---|---|
| | Investments, Inc.): Molecular Weight 139 | | | | | | | |
| | Viscoat#192 (manufactured by Osaka Organic Chemical Industry, Ltd.): Molecular Weight 192 | 20.0 | 20.0 | 22.0 | 22.0 | | | |
| | IBXA (manufactured by Osaka Organic Chemical Industry, Ltd.): Molecular Weight 208 | 17.0 | 17.0 | | | 15.0 | 15.0 | |
| | A-HD-N (manufactured by Shin-Nakamura Chemical Co., Ltd.): Molecular Weight 226 | | | 15.0 | 15.0 | 12.0 | 12.0 | |
| | APG-200 (manufactured by Shin-Nakamura Chemical Co., Ltd.): Molecular Weight 300 | 24.8 | 21.8 | 24.8 | 21.8 | 29.8 | 26.8 | |
| | MK Ester A-400 (manufactured by Shin-Nakamura Chemical Co., Ltd.): Molecular Weight 508 | | | | | | | |
| | MK Ester A-600 (manufactured by Shin-Nakamura Chemical Co., Ltd.): Molecular Weight 742 | | | | | | | |
| | Miramaer M3160 (manufactured by Miwon Specialty Chemical Co., Ltd.): Molecular Weight 560 | | | | | | | |
| | SR494 (manufactured by Sartomer Company, Inc.): Molecular Weight 693 | | | | | | | |
| Wax | Stearone (manufactured by Kao Corporation) | | | | | | | |
| Surfactant | KF352 (manufactured by Shin-Etsu Chemical Company) | 0.05 | 0.05 | 0.05 | 0.05 | 0.05 | 0.05 | |
| Photopolymerization Initiator | DAROCURE TPO (manufactured by BASF Japan, Ltd.) | 4.0 | 4.0 | 4.0 | 4.0 | 4.0 | 4.0 | |
| | IRGACURE 819 (manufactured by BASF Japan, Ltd.) | 2.0 | 2.0 | 2.0 | 2.0 | 2.0 | 2.0 | |
| | SPEEDCURE ITX (manufactured by DKSH Japan) | 2.0 | 2.0 | 2.0 | 2.0 | 2.0 | 2.0 | |
| | SPEEDCURE EDB (manufactured by DKSH Japan) | 3.0 | 3.0 | 3.0 | 3.0 | 3.0 | 3.0 | |
| Polymerization Inhibitor | UV10 (manufactured by BASF Japan, Ltd.) | 0.2 | 0.2 | 0.2 | 0.2 | 0.2 | 0.2 | |
| | Total | 100 | 100 | 100 | 100 | 100 | 100 | |
| | Total Monomers having a Molecular Weight of 400 to 1,500 in wt % | 0 | 0 | 0 | 0 | 0 | 0 | |
| | Temperature of Ink in Depressurized Space (° C.) | 40 | | 40 | | 40 | | |
| | Vacuum of Depressurized Space (-kPa) | 97 | | 97 | | 97 | | |
| | Ejection Temperature (° C.) | 30 | | 30 | | 30 | | |
| Evaluation Results | Discharge Stability 1 Minute After | B | | B | | B | | |
| | 5 Minutes After | C | | C | | C | | |
| | 10 Minutes After | D | | D | | D | | |
| | Curability | B | | B | | B | | |
| | Image Quality | D | | D | | D | | |

| | | Comparative Example | | |
|---|---|---|---|---|
| | | 4 | 5 | 6 |

| | | | | | | |
|---|---|---|---|---|---|---|
| Pigment Dispersion Liquid | Yellow Pigment Dispersion Liquid | 12.0 | | 12.0 | | 12.0 | |
| | Magenta Pigment Dispersion Liquid | | 15.0 | | 15.0 | | 15.0 |
| Photopolymerizable Compound | V-CAP (manufactured by ISP Investments, Inc.): Molecular Weight 139 | 20.0 | 20.0 | 20.0 | 20.0 | | |
| | Viscoat#192 (manufactured by Osaka Organic Chemical Industry, Ltd.): Molecular Weight 192 | | | | | | |
| | IBXA (manufactured by Osaka Organic Chemical Industry, Ltd.): Molecular Weight 208 | 15.0 | 15.0 | 15.0 | 15.0 | | |
| | A-HD-N (manufactured by Shin-Nakamura Chemical Co., Ltd.): Molecular Weight 226 | 12.0 | 12.0 | 12.0 | 12.0 | | |
| | APG-200 (manufactured by Shin-Nakamura Chemical Co., Ltd.): Molecular Weight 300 | 29.8 | 26.8 | 29.8 | 26.8 | 8.0 | 8.0 |
| | MK Ester A-400 (manufactured by Shin-Nakamura Chemical Co., Ltd.): Molecular Weight 508 | | | | | 10.0 | 10.0 |
| | MK Ester A-600 (manufactured by Shin-Nakamura Chemical Co., Ltd.): Molecular Weight 742 | | | | | 10.0 | 10.0 |
| | Miramaer M3160 (manufactured by Miwon Specialty Chemical Co., Ltd.): Molecular Weight 560 | | | | | 28.8 | 25.8 |
| | SR494 (manufactured by Sartomer Company, Inc.): Molecular Weight 693 | | | | | 20.0 | 20.0 |
| Wax | Stearone (manufactured by Kao Corporation) | | | | | | |
| Surfactant | KF352 (manufactured by Shin-Etsu Chemical Company) | 0.05 | 0.05 | 0.05 | 0.05 | 0.05 | 0.05 |
| Photopolymerization Initiator | DAROCURE TPO (manufactured by BASF Japan, Ltd.) | 4.0 | 4.0 | 4.0 | 4.0 | 4.0 | 4.0 |
| | IRGACURE 819 (manufactured by BASF Japan, Ltd.) | 2.0 | 2.0 | 2.0 | 2.0 | 2.0 | 2.0 |
| | SPEEDCURE ITX (manufactured by DKSH Japan) | 2.0 | 2.0 | 2.0 | 2.0 | 2.0 | 2.0 |
| | SPEEDCURE EDB (manufactured by DKSH Japan) | 3.0 | 3.0 | 3.0 | 3.0 | 3.0 | 3.0 |
| Polymerization Inhibitor | UV10 (manufactured by BASF Japan, Ltd.) | 0.2 | 0.2 | 0.2 | 0.2 | 0.2 | 0.2 |
| | Total | 100 | 100 | 100 | 100 | 100 | 100 |
| | Total Monomers having a Molecular Weight of 400 to 1,500 in wt % | 0 | 0 | 0 | 0 | 68.8 | 65.8 |
| | Temperature of Ink in Depressurized Space (° C.) | 40 | | 40 | | 40 | |
| | Vacuum of Depressurized Space (-kPa) | 80 | | 60 | | 97 | |
| | Ejection Temperature (° C.) | 30 | | 30 | | 80 | |

TABLE 4-continued

| Evaluation Results | Discharge Stability | 1 Minute After | C | D | D |
|---|---|---|---|---|---|
| | | 5 Minutes After | D | D | D |
| | | 10 Minutes After | D | D | D |
| | Curability | | C | C | C |
| | Image Quality | | D | D | D |

In the recording methods of Comparative Examples 1 to 5, the image quality was low, and the discharge stability was low. It is deduced that, while the inkjet inks of Comparative Examples 1 to 5 contained a photopolymerizable compound having a molecular weight of 250 to 1,500, the temperature of the ink in the depressurized space was low, and thus degassing was not performed sufficiently, causing the discharge stability to be lowered. In addition, it is deduced that, since the ink contained a large amount of components having a molecular weight of less than 250, the low molecular weight components were more likely to volatilize also in a head, which also caused the discharge stability to be lowered. Further, the low molecular weight components were more likely to volatilize during degassing, causing the composition of the ink to be changed, and thus the image quality became worse.

On the other hand, even in the case where the ink contained a large amount of photopolymerizable compounds having a molecular weight of 250 to 1,500, when the ink was degassed at 40° C. and at −97 kPa, the discharge stability was low (Comparative Example 6). It is deduced that, at an ink temperature of 40° C. and a vacuum of −97 kPa in the depressurized space, the ink temperature was low, and the ink was not easily degassed sufficiently.

This application is entitled to and claims the benefit of Japanese Patent Application No. 2014-052306, filed on Mar. 14, 2014, the disclosure of which including the specification, drawings and abstract is incorporated herein by reference in its entirety.

INDUSTRIAL APPLICABILITY

According to the present invention, it is possible to provide an inkjet recording method capable of sufficiently removing air bubbles contained in an actinic radiation-curable inkjet ink, and of enhancing discharge stability and curability.

REFERENCE SIGNS LIST 10, 60 Inkjet recording apparatus
11, 61 Recording head
13, 63 Head carriage
15 Ink channel
17 Ink tank
19 Degassing module
20 Recording medium
21 Actinic radiation irradiation section
23 Temperature control section
25, 41 Hollow fiber aggregate
27 Housing
27A Housing main body
29 Jacket heater (heating means)
31 Hollow fiber
31A Hollow fiber hole
33 Ink inlet
35 Suction port
37 Ink discharge port
39 Center hole
43 Porous case
45 Introducing connection port
47 Discharging connection port
65 Guide section
70, 70' Depressurization tank
71 Nozzle
72 Depressurization pump
73 Channel
79, 79' Depressurization degassing module
80 Degassed ink
81 Air layer
89, 89' Hollow fiber degassing module

The invention claimed is:

1. An inkjet recording method using an actinic radiation-curable inkjet ink containing a coloring material, a photopolymerization initiator, and a photopolymerizable compound having a molecular weight within a range of 250 to 1,500, the method comprising:
    introducing the inkjet ink into a depressurized space inside an inkjet recording apparatus to degass the inkjet ink at an ink temperature of 50° C. or higher to lower than 120° C.;
    discharging ink droplets of the degassed inkjet ink from a recording head to land the ink droplets onto a recording medium; and
    irradiating the ink droplets landed on the recording medium with actinic radiation to cure the ink droplets.

2. The inkjet ink recording method according to claim 1, wherein:
    the photopolymerizable compound has a molecular weight of 400 to 1,500, and
    the inkjet ink contains 30 to 70 mass % of the photopolymerizable compound based on a total amount of the inkjet ink.

3. The inkjet ink recording method according to claim 1, wherein the inkjet ink further contains a wax.

4. The inkjet ink recording method according to claim 1, wherein the degassing step is a step of degassing the inkjet ink while degassing the space to have a vacuum of less than −90 kPa.

5. The inkjet ink recording method according to claim 1, wherein the curing step is a step of moving the recording medium and a light source of the actinic radiation relatively with each other at 50 m/min or higher to cure the ink droplets.

6. The inkjet ink recording method according to claim 1, wherein the viscosity at 80° C. of the inkjet ink is 3 to 20 mPa·s.

7. The inkjet ink recording method according to claim 1, wherein the viscosity at 25° C. of the inkjet ink is 1,000 mPa·s or higher.

* * * * *